US008515586B2

(12) United States Patent
Nishiguchi et al.

(10) Patent No.: US 8,515,586 B2
(45) Date of Patent: Aug. 20, 2013

(54) CONTROL MODEL UPDATING DEVICE AND METHOD, AIR-CONDITIONER CONTROLLING SYSTEM, AND DATA SUITABILITY EVALUATING DEVICE

(75) Inventors: Junya Nishiguchi, Tokyo (JP); Tomohiro Konda, Tokyo (JP)

(73) Assignee: Azbil Corporation, Tokyo (JP)

( * ) Notice: Subject to any disclaimer, the term of this patent is extended or adjusted under 35 U.S.C. 154(b) by 174 days.

(21) Appl. No.: 13/039,685

(22) Filed: Mar. 3, 2011

(65) Prior Publication Data

US 2011/0224832 A1 Sep. 15, 2011

(30) Foreign Application Priority Data

Mar. 11, 2010 (JP) ................................ 2010-054339

(51) Int. Cl.
| | |
|---|---|
| *G01M 1/38* | (2006.01) |
| *G05B 13/00* | (2006.01) |
| *G05B 15/00* | (2006.01) |
| *G05B 17/00* | (2006.01) |
| *G05B 13/02* | (2006.01) |
| *G06F 7/60* | (2006.01) |
| *G06F 7/48* | (2006.01) |

(52) U.S. Cl.
USPC ............... 700/276; 700/29; 700/32; 700/277; 700/278; 703/2; 703/3

(58) Field of Classification Search
USPC ....................... 700/28–31, 276–278; 703/2–3
See application file for complete search history.

(56) References Cited

U.S. PATENT DOCUMENTS

| 6,480,876 | B2 * | 11/2002 | Rehg et al. .................... 718/100 |
| 6,675,189 | B2 * | 1/2004 | Rehg et al. .................... 718/100 |
| 2005/0033530 | A1 * | 2/2005 | Stephenson et al. ............ 702/45 |
| 2006/0079983 | A1 * | 4/2006 | Willis .......................... 700/108 |
| 2008/0082304 | A1 * | 4/2008 | Miller .............................. 703/9 |
| 2012/0123583 | A1 * | 5/2012 | Hazen et al. .................. 700/110 |

FOREIGN PATENT DOCUMENTS

| JP | 6-332506 A | 12/1994 |
| JP | 2004-293844 A | 10/2004 |
| JP | 2006-207929 A | 8/2006 |

* cited by examiner

*Primary Examiner* — Ramesh Patel
(74) *Attorney, Agent, or Firm* — Troutman Sanders LLP

(57) ABSTRACT

A control model updating device includes a control model calculating unit that calculates a control model using analysis data, a control model updating unit that updates by accepting the control model, and a data suitability evaluating unit that evaluates the suitability of analysis data. The data suitability evaluating unit has a function characteristic prior knowledge storing unit that stores prior knowledge regarding a characteristic obtained in advance regarding the subject of control, a quadratic polynomial calculating unit that calculates a quadratic polynomial wherein the analysis data is approximated by a quadratic function, and a characteristic evaluating unit that compares a characteristic of the quadratic polynomial, calculated by the quadratic polynomial calculating unit, to prior knowledge stored in the function characteristic prior knowledge storing unit. The control model updating unit updates the control model if the two match in the comparison.

8 Claims, 16 Drawing Sheets

US 8,515,586 B2

CONTROL MODEL UPDATING DEVICE AND METHOD, AIR-CONDITIONER CONTROLLING SYSTEM, AND DATA SUITABILITY EVALUATING DEVICE

CROSS REFERENCE TO RELATED APPLICATIONS

The present application claims priority under 35 U.S.C. §119 to Japanese Patent Application No. 2010-054339, filed Mar. 11, 2010, which is incorporated herein by reference.

FIELD OF TECHNOLOGY

The present invention relates to a control model updating device, a control model updating method, an air-conditioner controlling system, and a data suitability evaluating device. Specifically, the present invention relates to a control model updating device for updating an objective approximating function as a control model in optimal control of controlled systems such as air-conditioning systems using, for example control models.

BACKGROUND OF THE INVENTION

A variety of methods have been proposed as methods for optimal operating control of, for example, central air-conditioning systems. Japanese Unexamined Patent Application Publication 2004-293844 ("JP '844") describes a method for performing operating control of air-conditioning equipment using a simulation model. In this method, a simulation model of the entirety of the air-conditioning system must be constructed in advance.

A simulation of the operation of the air-conditioning system is performed on the simulation model, to find optimal control target values for minimizing the running cost of the air-conditioning system as a whole in the simulated operations. Moreover, the actual air-conditioning system is operated using the optimal control target values that have been found. Doing so enables optimal operation to minimize the running cost.

Here, in the operation control method set forth in JP '844, the simulation model of the entirety of the air-conditioning system must be constructed in advance. However, because in actual air-conditioning systems there will be different installation conditions and different operating conditions, there is a problem in that the operating characteristics will differ for each individual air-conditioning system. Moreover, even given identical equipment and systems, there is still a problem in that there will be changes in characteristics due to changes over time, and of course due to changes in characteristics depending on the season, the day of the week, the time of day, and the like. Consequently, a single static simulation model is inadequate, and it is necessary to update and adjust the simulation model as appropriate in accordance with the actual operating characteristics of the air-conditioning system.

However, for an operator to perform this type of sequential adjustment updating operation, it would require not just a substantial amount of specialized prior knowledge, but also a great deal of time and effort.

Given this, as a method for handling this type of situation, Japanese Unexamined Patent Application Publication H6-332506 ("JP '506"), for example, discloses a control device for automatically correcting and updating model functions.

The technology disclosed in the JP '506 gathers data indicating the input/output relationships for the apparatus controlled. Model functions for approximating the characteristic distributions obtained from the data are then calculated. Moreover, data are collected at specific time intervals during operating control of the apparatus controlled using the model functions, and these data are used to correct and update the model functions. The model functions can be updated constantly in response to changes in the system installation conditions and operating conditions through correcting and updating the models using measurement data during operations in this way, and optimal control is performed in accordance with actual conditions.

A similar disclosure is made also in, for example, Japanese Unexamined Patent Application Publication 2006-207929.

However, there may be some cases wherein the data themselves are unsuitable when calculating the model functions from the measured data.

For example, there may be cases wherein the measurement instruments themselves have measurement errors, or the measurement instruments may sometimes be influenced by the ambient environment to produce variability in the measurement values.

Furthermore, there is often noise in the data as well.

If the measurement error is too large, or if the noise is too great, then incorrect values may be incorporated within the data.

When control models are calculated based on this type of incorrect data, then models will be produced that do not accurately reflect the actual behavior of the apparatus to be controlled.

Given this, control based on incorrect control models will cause a departure from optimal control, which, in the worst-case scenario, engenders the risk of losing stability in control, and falling into a state wherein the equipment becomes inoperable.

The object of the present invention is to provide a control model updating device and a control model updating method able to update with appropriate control models only, by not updating control models incorrectly.

Furthermore, the present invention provides a controlling system for air-conditioning equipment to achieve optimal control through control models that are updated optimally.

SUMMARY OF THE INVENTION

The control model updating device according to the present invention is a control model updating device for calculating and updating a control model that is a function for approximating an apparatus to be controlled, doing so using analysis data that is provided in order to update a control model for the apparatus to be controlled, including a control model calculating unit for calculating the control model using the analysis data; a control model updating unit for updating through accepting a control model calculated by the control model calculating unit; and a data suitability evaluating unit for evaluating the suitability of the analysis data. Also, the data suitability evaluating unit has a characteristic prior knowledge storing unit for storing prior knowledge regarding the characteristics obtained in advance regarding the apparatus to be controlled; a quadratic polynomial calculating unit for calculating a quadratic polynomial that approximates the analysis data using a quadratic function; and a characteristic evaluating unit for comparing the characteristics of the quadratic polynomial, calculated by the quadratic polynomial calculating unit, to the prior knowledge stored in the characteristic prior knowledge storing unit. Further, the control model updating unit updates the control model when there is a match between the two in the comparison in the characteristic evaluating unit.

In the present invention, the prior knowledge that is set and stored in the characteristic prior knowledge storing unit is prior knowledge of a case wherein the characteristic subject to control is expressed by a quadratic polynomial, where the quadratic polynomial is either upwardly convex or downwardly convex.

Also, the data suitability evaluating unit further includes a range-of-variable storing unit for storing a range of variability of a variable as a constraint condition; and an extremal point evaluating unit for comparing an extremal point of a quadratic polynomial calculated by the quadratic polynomial calculating unit to the range of variability of the variable, stored in the range-of-variability storing unit. Also, the control model updating unit performs the update of the control model when, in the evaluation by the extremal point evaluating unit, the relationship between the extremal point of the quadratic polynomial and the range of variability of the variable is appropriate.

Furthermore, in the present invention, the relationship between the extremal point of the quadratic polynomial and the scope of variability of the variable is any of the three patterns: the extremal point is within the range of variability of the variable, the extremal point is greater than an upper limit value, or the extremal point is less than an upper limit value; and the extremal point evaluating unit evaluates one of the three patterns as suitable using an evaluation standard that is set in accordance with characteristics obtained in advance for the apparatus to be controlled.

A control model updating method according to the present invention is a control model updating method for calculating and updating a control model that is a function for approximating an apparatus to be controlled, doing so using analysis data that is provided in order to update a control model for the apparatus to be controlled, having a control model calculating step for calculating the control model using the analysis data; a quadratic polynomial calculating step for calculating a quadratic polynomial that approximates the analysis data using a quadratic function; a characteristic evaluating step for comparing a characteristic of the calculated quadratic polynomial to prior knowledge regarding a characteristic obtained in advance regarding the apparatus to be controlled; and a control model updating step for updating the control model when there is a match between the two in the comparison in the characteristic evaluating step.

An air-conditioner controlling system according to the present invention includes the control model updating device; a thermal source system as an apparatus to be controlled; and a control unit for controlling an operation of the thermal source system using a control model that is updated by the control model updating device.

A data suitability evaluating device according to the present invention is a data suitability evaluating device for evaluating suitability of analysis data applied in order to calculate a control model for an apparatus to be controlled; having a characteristic prior knowledge storing unit for storing prior knowledge regarding the characteristics obtained in advance regarding the apparatus to be controlled; a quadratic polynomial calculating unit for calculating a quadratic polynomial that approximates the analysis data using a quadratic function; and a characteristic evaluating unit for comparing the characteristics of the quadratic polynomial, calculated by the quadratic polynomial calculating unit, to the prior knowledge stored in the characteristic prior knowledge storing unit.

In the present invention, the prior knowledge that is set and stored in the characteristic prior knowledge storing unit is prior knowledge of a case wherein the characteristic subject to control is expressed by a quadratic polynomial, where the quadratic polynomial is either upwardly convex or downwardly convex.

The present invention is able to avoid inappropriate control based on an incorrect control model by evaluating whether or not analysis data is suitable, through the use of prior knowledge possessed in advance by an operator, or the like. Moreover, the present invention enables easy structuring and processing operations in evaluating the suitability of the analysis data because the evaluation of suitability is performed at the level of a quadratic polynomial.

DETAILED DESCRIPTION OF THE INVENTION

Forms of embodiment according to the present invention will be illustrated below, and will be explained in reference to codes that are assigned to individual elements within the drawings.

Figure 1:
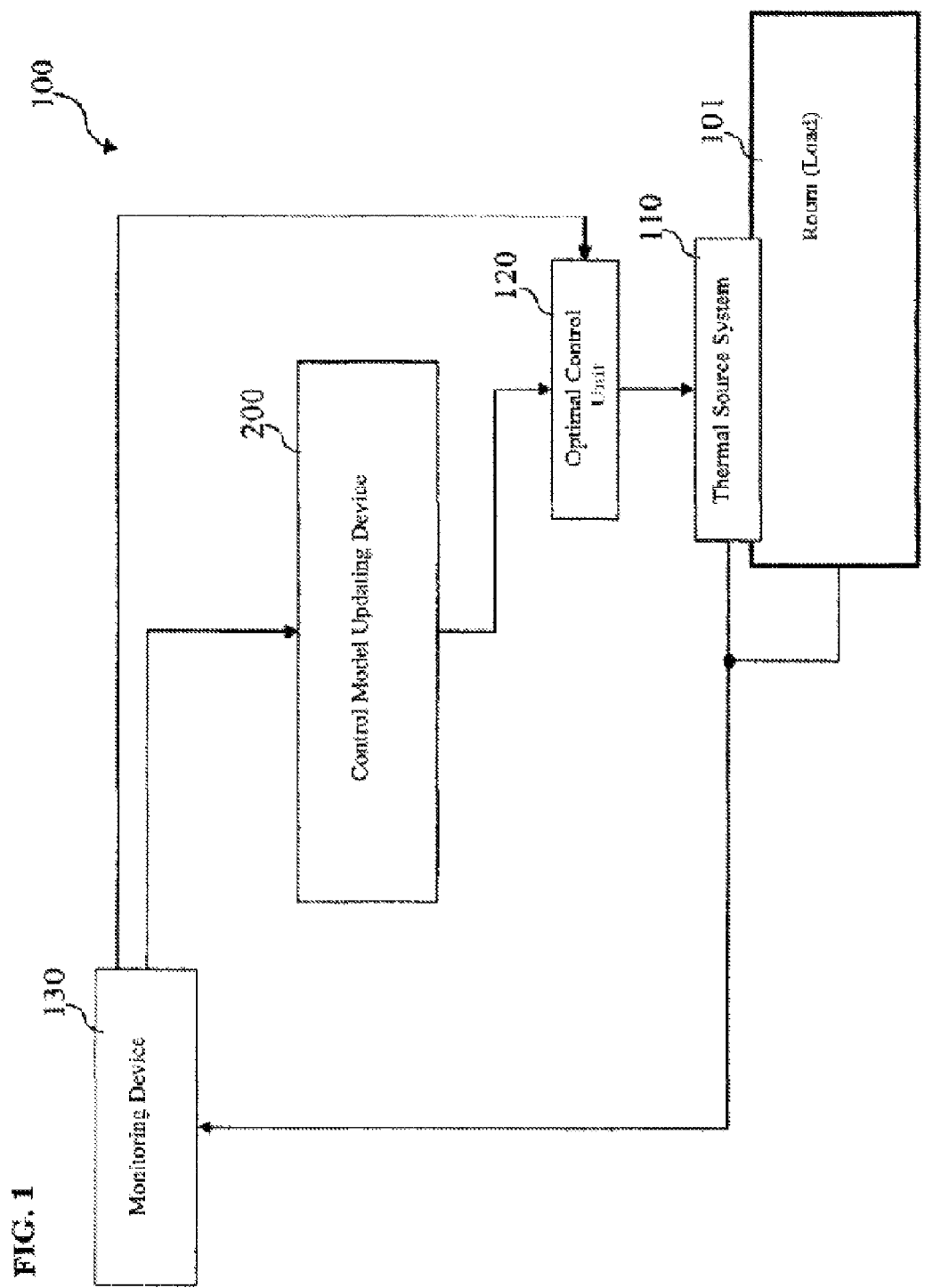
FIG. 1 is a block diagram illustrating the overall structure of an air-conditioning system.

FIG. 1 is a block diagram illustrating the overall structure of an air-conditioning system.

The air-conditioning system 100 has a thermal source system 110 that is to be controlled; an optimal controlling unit 120 for optimal control of the thermal source system 110; a monitoring device 130 for monitoring the air-conditioning system as a whole; and a control model updating device 200 for updating a control model used by the optimal controlling unit 120.

Figure 2:
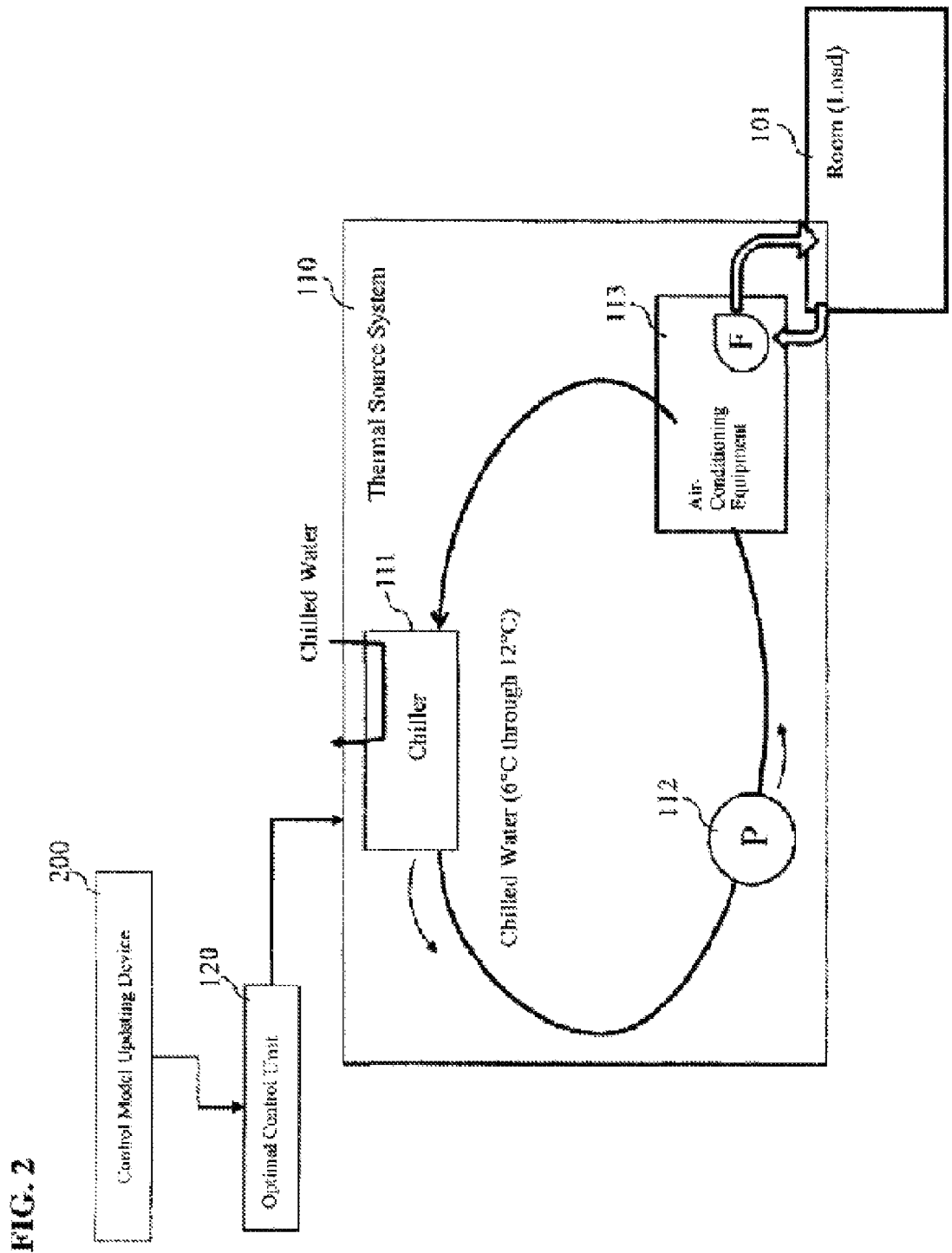
FIG. 2 is a diagram illustrating one example of a structure of a thermal source system.

The thermal source system 110 adjusts the temperature of a room (load) 101. FIG. 2 is a diagram illustrating an example of a structure for the thermal source system 110. The thermal source system 110 comprises: a chiller 111 for producing chilled water; a pump 112 for circulating the chilled water; and an air-conditioning device 113 that circulates air.

In the chiller 111, a control target value for the chilled water outlet temperature can be changed by a command from the outside. For example, the temperature of the chilled water can be changed in a range between 6° C. and 12° C. A pump 112 circulates the chilled water that is produced by the cooling device. The air-conditioning device 113 causes the chilled water to contact the air of the room 101, and circulates the chilled air to the room 101.

Here, when air-conditioning the temperature of the room 101 to a specific temperature, the operating cost of the thermal source system will change when the chilled water outlet temperature is changed. For example, when the chilled water outlet temperature is increased (for example, to 12° C.), then the operating cost of the chiller 111 will be reduced.

However, because the air of the room 101 must be cooled with chilled water of a higher temperature, the pump flow rate must be increased. This increases the operating cost of the pump 112.

Conversely, when the chilled water outlet temperature is decreased (for example, to 6° C.), then the operating cost of the chiller 111 will be higher.

On the other hand, because the air in the room will be cooled with chilled water of a lower temperature, then the pump flow rate may be lower. The result is that, in this case, the operating cost of the pump 112 will be reduced.

In this way, when performing air-conditioning of the temperature in the room 101 to a specific temperature, there is a trade-off relationship between the operating cost of the chiller 111 and the operating cost of the pump 112.

Figure 3:
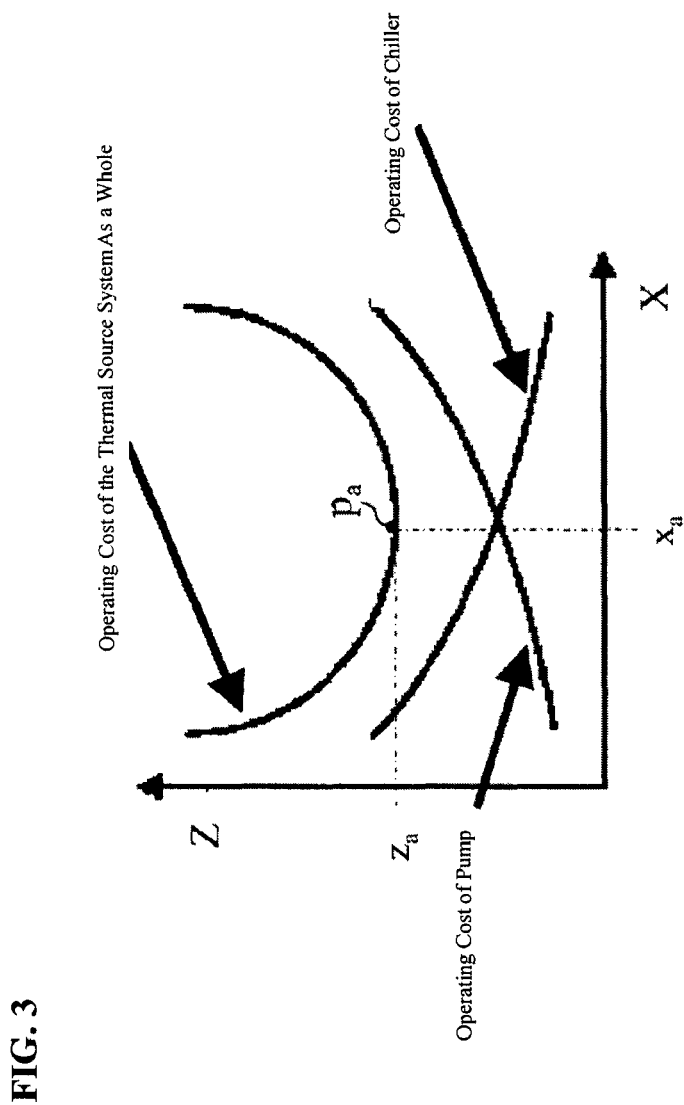
FIG. 3 is a diagram for explaining the relationships with the operating costs of the thermal source system as a whole.

As illustrated in FIG. 3, when this relationship is illustrated with the chilled water outlet temperature on the horizontal axis (X) and the operating cost on the vertical axis (Z), the operating cost of the thermal source system as a whole has characteristics that are downwardly convex.

Consequently, there exists an optimal control point Pa wherein the operating cost of the thermal source system 110 is minimized.

Here the operating cost Z in relation to the chilled water outlet temperature X can be modeled as a simple input/output relationship, as in Equation 1, below, for the purposes of the explanation.

Figure 4:
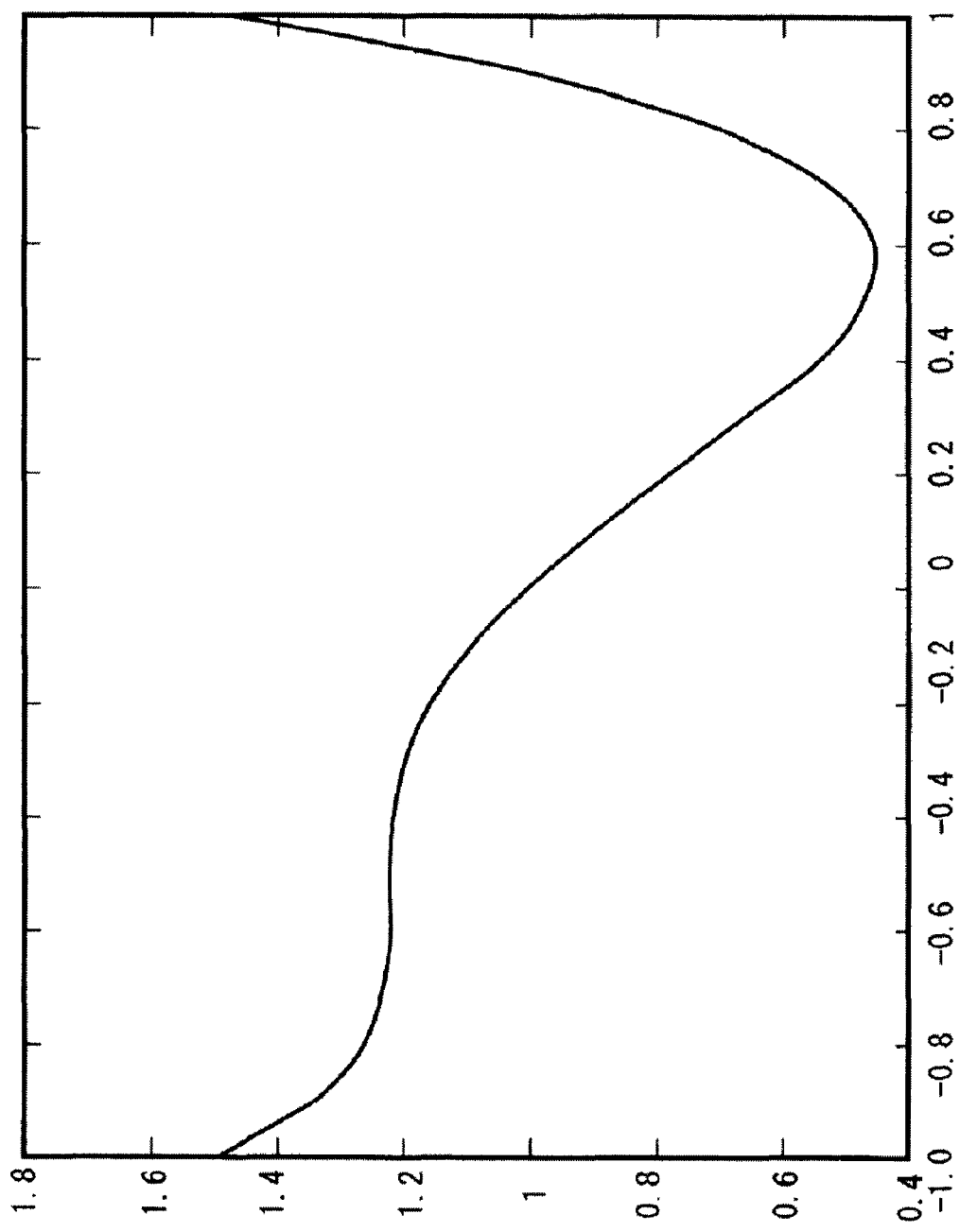
FIG. 4 is a diagram illustrating a control model for a thermal source system in a graph.

FIG. 4 is a diagram wherein Equation 1 is illustrated in a graph.

$$Z = 1.5X^4 + X^3 - X^2 - X + 1 \quad \text{(Equation 1)}$$

The optimal controlling unit 120 performs optimal control of the thermal source system 110 so as to minimize the operating cost. The optimal controlling unit 120 applies a control model for the thermal source system 110 from the control model updating device 200. The optimal controlling unit 120 calculates optimal control target values using this control model and controls the operation of the chiller 111 and the pump 120 in accordance with the optimal control target values.

The monitoring device 130 monitors the operating state of the thermal source system 110 to obtain data through a variety of sensors, not shown.

As this data that is obtained there is, for example, the outside air temperature, the chilled water outlet temperature, the temperature of the water that is chilled by the chiller 111, the pump flow rate, the pump pressure, the room temperature, the rate of energy consumption (electricity, gas, etc.), and the like.

Additionally, the monitoring device 130 stores the thermal load, room entropy, the cost of electricity, the cost of gas, and the like, and the temperature settings for the room, and the like, set by the hour, weekday, and month units.

The monitoring device 130, at regular periods, applies the data listed above to the control model updating device 200 as the analysis data that is required in constructing the control model for the thermal source system 110. Moreover, the monitoring device 130 applies the data that is necessary to the operation of the thermal source system 110 to the optimal controlling unit to cause the optimal controlling unit 120 to perform optimal control of the thermal source system 110.

The data required for operation is, for example, the cost of electricity, the cost of gas, and the like, along with the temperature setting for the room, set by the hour, weekday, and month units.

Figure 5:
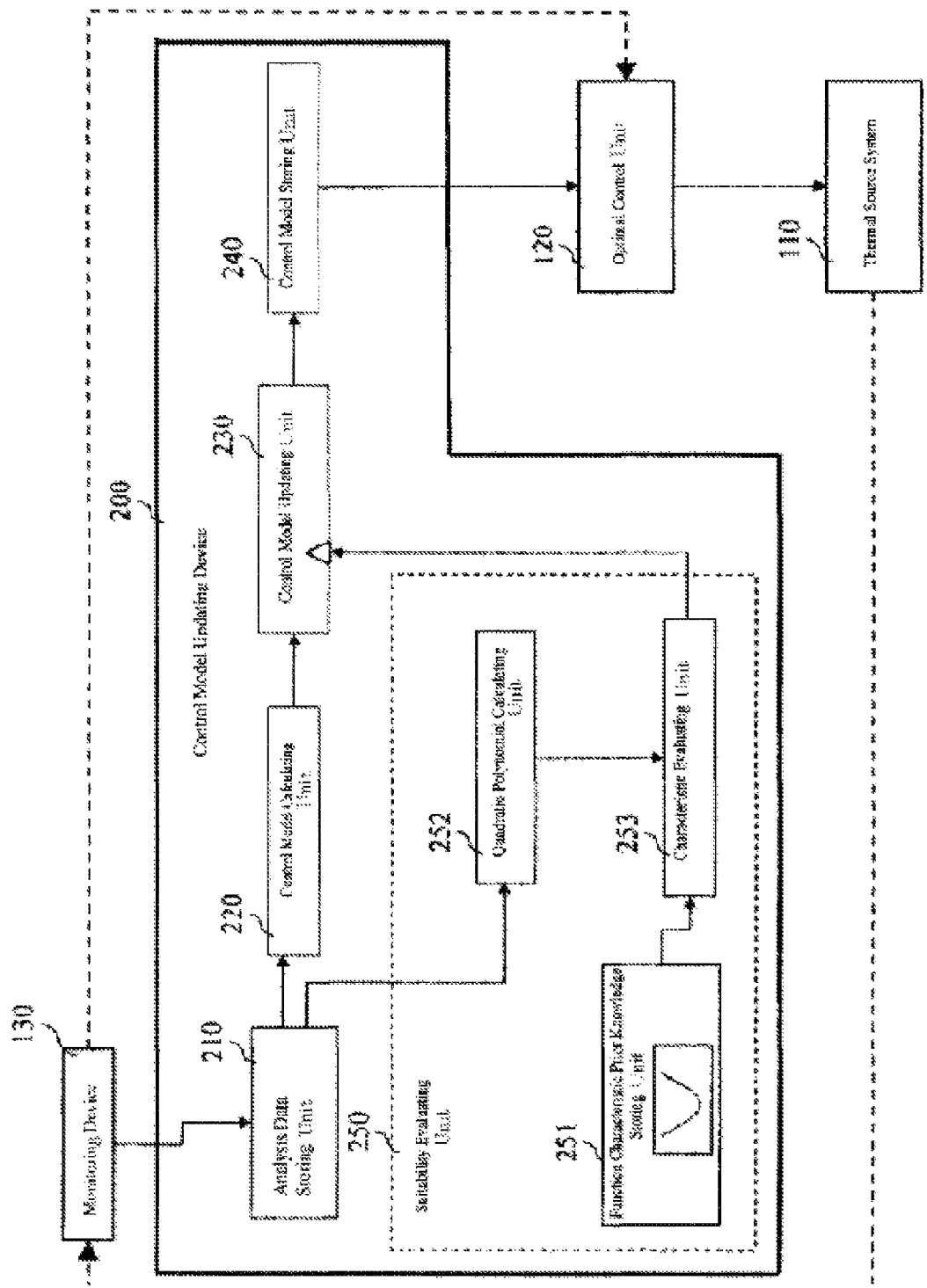
FIG. 5 is a functional block diagram of a control model updating device.

The control model updating device 200 will be explained next. FIG. 5 is a functional block diagram of a control model updating device 200. The control model updating device 200 comprises an analysis data storing unit 210, a control model calculating unit 220, a control model updating unit 230, a control model storing unit 240, and a data suitability evaluating unit 250.

The analysis data storing unit 210 is a buffer memory wherein analysis data, provided by the monitoring device 130, is stored temporarily.

The data that is buffered in the analysis data storing unit 210 is outputted to the control model calculating unit 220 and to the data suitability evaluating unit 250.

The control model calculating unit 220 outputs a control model for the thermal source system 110 that is subject to control, based on the analysis data. The control model is a function equation that approximates the behavior of the thermal source system 110. Here the operation of the thermal source system 110 is varied by external factors, such as the ambient temperature, the temperature of the water chilled by the chiller 111, and the room temperature, along with changes in characteristics of the chiller 111 and the pump 112. Given this, the control model calculating unit 220 uses the analysis data, provided at regular intervals, to calculate a control model for the thermal source system 110 reflecting the current operating conditions.

If the analysis data is suitable, then the operating cost Z should be as set forth above in Equation 1 relative to the chilled water outlet temperature X, reflecting correctly the model of the thermal system 110. In contrast, if the analysis data includes unsuitable data, then an incorrect control model would be calculated from Equation 1.

In the last step, the control model updating unit 230 accepts the control model calculated by the control model calculating unit 220, and overwrites to the control model storing unit 240.

The control model storing unit 240 always stores the latest control model, and applies this model to the optimal controlling unit 120.

The data suitability evaluating unit 250 will be explained next. The data suitability evaluating unit 250 comprises a function characteristic prior knowledge storing unit (characteristic prior knowledge storing unit) 251, a quadratic polynomial calculating unit 252, and a characteristic evaluating unit 253.

The function characteristic prior knowledge storing unit 251 inputs and sets prior knowledge, obtained in advance, regarding the characteristics of the thermal source system 110 that is subject to control. For example, in the thermal source system 110, the relationship between the chilled water outlet temperature (X) and the operating cost (Z) is known in advance to be a trade-off relationship. Given this, it is known that there is an optimal control point Pa, when there is a change in the chilled water outlet temperature, wherein the operating cost of the thermal source system 110 will be minimized.

Given this, in the function characteristic prior knowledge storing unit 251, the type of the function that represents, in a quadratic polynomial, the apparatus to be controlled (the thermal source system 110) is set and stored as function characteristic prior knowledge. Here the quadratic polynomial has a shape that is either upwardly convex or downwardly convex. That is, the function characteristic prior knowledge of either "upwardly convex" or "downwardly convex" is set and stored in the function characteristic prior knowledge storing unit 251.

In the present form of embodiment, for the example of the thermal source system 110, "downwardly convex" is set and inputted as the function characteristic prior knowledge.

Analysis data from the analysis data storing unit 210 is inputted into the quadratic polynomial calculating unit 252. After this, the quadratic polynomial calculating unit 252 calculates an approximation curve wherein the analysis data is approximated by a quadratic polynomial. The quadratic polynomial calculating unit 252 outputs the calculated quadratic polynomial to the characteristic evaluating unit 253.

The characteristic evaluating unit 253 compares the quadratic polynomial obtained from the quadratic polynomial calculating unit 252 to the setting stored in the function characteristic prior knowledge storing unit 251, and then evaluates whether or not the quadratic polynomial matches the characteristic prior knowledge that was obtained in advance.

If the quadratic polynomial matches the characteristic prior knowledge obtained in advance, then the characteristic evaluating unit 253 directs the control model updating unit 230 to update the control model.

On the other hand, if the quadratic polynomial does not match the characteristic prior knowledge obtained in advance, then the characteristic evaluating unit 253 does not direct the control model updating unit 230 to update the control model.

The sequence of operations of the control model updating device 200 provided with this structure will be explained using a flowchart and a specific example.

Figure 6:
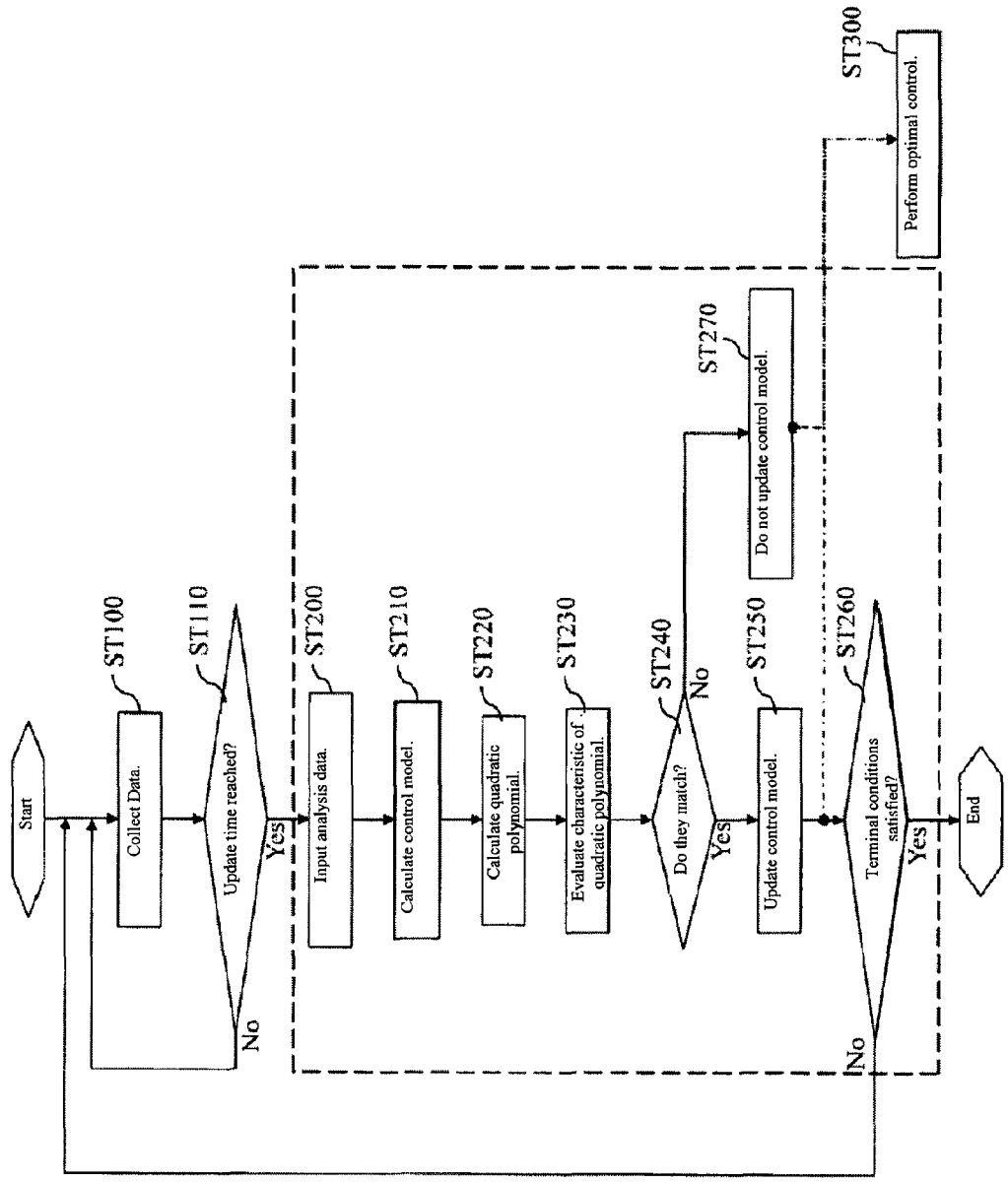
FIG. 6 is a flowchart for explaining the sequence of operations in the control model updating device.

FIG. 6 is a flowchart for explaining the sequence of operations of the control model updating device 200.

First the operating state of the thermal source system 110 is monitored by the monitoring device 130 to collect analysis data (ST100). Data collection continues until a specific model updating schedule is reached, and when the updating schedule is reached (ST110: YES), the analysis data is inputted from the monitoring device 130 into the analysis data storing unit 210 (ST200).

Here it will be assumed, as an example, that a data set comprising the following eight points (A through H) has been obtained as analytic data (X, Z) expressing the relationship between the chilled water outlet temperature X and the operating cost Z of the thermal source system 110.

A (−1.0, 1.5),
B (−0.8, 1.2624),
C (−0.2, 1.1544),
D (0.3, 0.6492),
E (0.5, 0.4688),
F (0.6, 0.4504),
G (0.8, 0.6864),
H (1.0, 1.5).

Here the chilled water outlet temperature X is a value that is normalized, where, for example, the data for the range between 6° C. through 12° C. is normalized to −1.0 through 1.0. The operating cost Z may be an expense that is calculated in terms of money, such as the cost of electricity or the cost of gas, or may be indexed through a specific equation.

Figure 7:
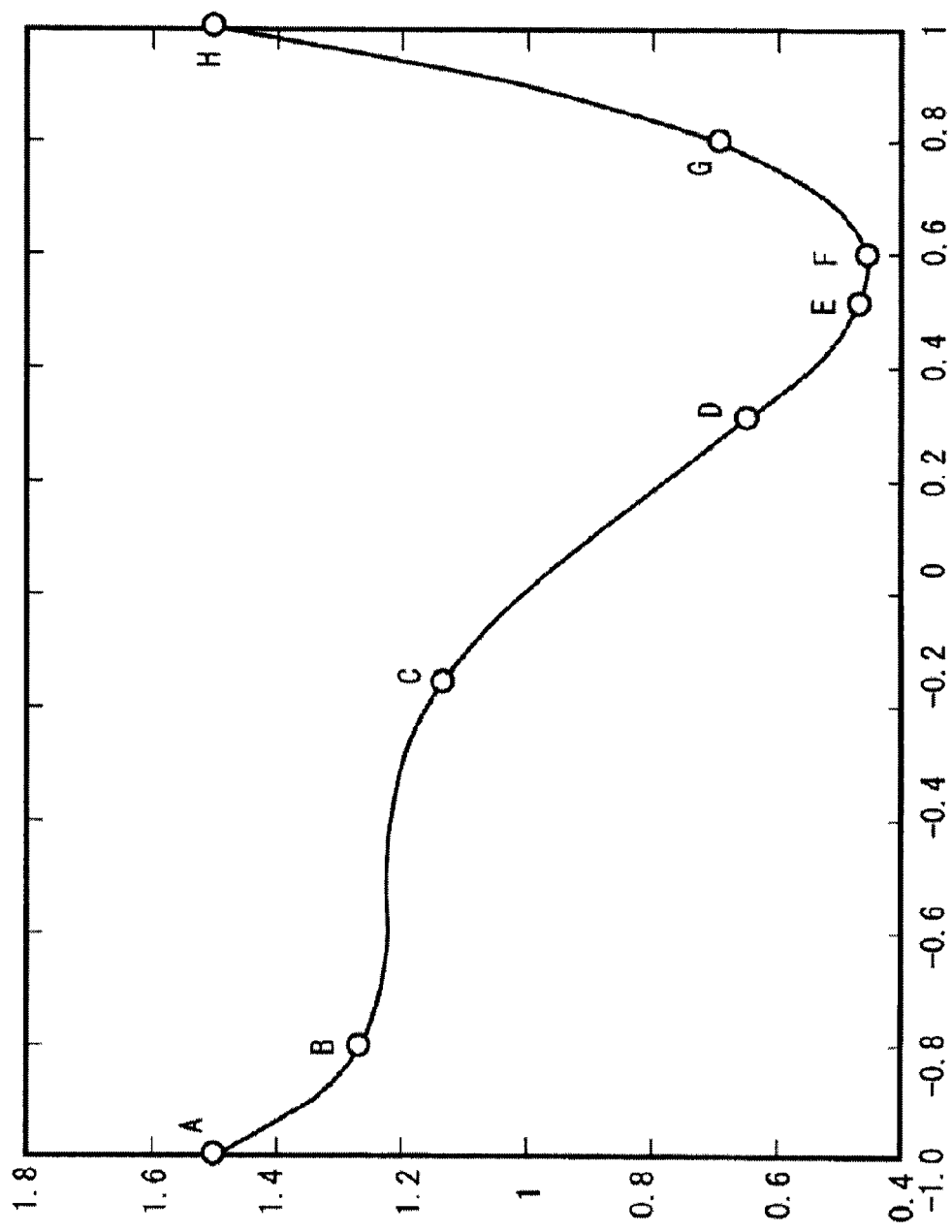
FIG. 7 is a diagram illustrating Data A through H in a graph.

Note that these data A through H, as illustrated in FIG. 7, are used as points on a control model that is appropriate for the thermal source system 110 (Equation 1).

When the analysis data is inputted into the analysis data storing unit 210, then the analysis model is calculated by the analysis model calculating unit 220 based on these analysis data (ST210). The calculated control model waits as-is, temporarily stored in the buffer, until it is accepted by the control model updating unit 230.

Additionally, a quadratic polynomial that approximates the analysis data is calculated by the quadratic polynomial calculating unit 252 (ST220).

When the quadratic polynomial that approximates the eight points that are obtained such as A through H, then the result will be resemble Equation 2.

That is, in this case, a quadratic polynomial that is downwardly convex is obtained.

$$Z = 0.7142X^2 - 0.2525X + 0.6379 \quad \text{(Equation 2)}$$

Figure 8:
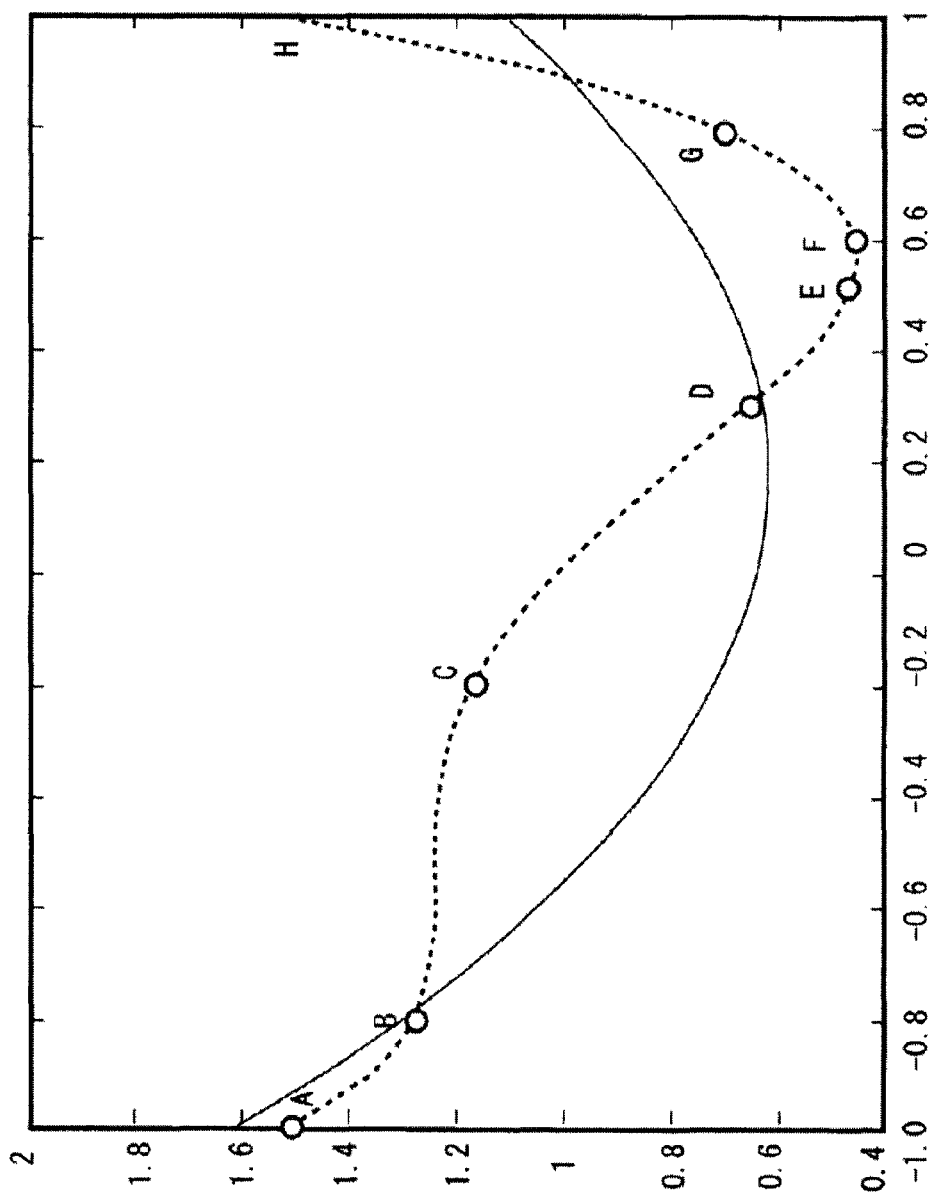
FIG. 8 is a diagram illustrating a quadratic polynomial (Equation 2) in a graph.

FIG. 8 is a graph illustrating this quadratic polynomial.

The quadratic polynomial that is calculated in this way is outputted to the characteristic evaluating unit 253.

Following this, an evaluation is performed as to whether or not the calculated quadratic polynomial matches the prior knowledge that has been obtained in advance (ST230).

That is, first the characteristic evaluating unit 253 evaluates whether the shape of the quadratic polynomial that has been calculated (Equation 2) is upwardly convex or downwardly convex.

Here this is a single-variable second-order equation, and thus this may be determined by whether the sign of the coefficient of the highest order term ($X^2$) is positive or negative.

The $X^2$ coefficient is 0.7142, and thus the sign is positive, and, as a result, it can be determined that this is a shape that has convexity downward.

Additionally, the characteristic evaluating unit 253 reads out the prior knowledge that is set and stored in advance in the function characteristic prior knowledge storing unit 251. Here the prior knowledge of "downwardly convex" is set.

Consequently, the form of the quadratic polynomial matches the prior knowledge (ST240: YES)

When the form of the quadratic polynomial matches the prior knowledge (ST240: YES), then the control model updating unit 230 is directed by the characteristic evaluating unit 253 to update the control model. At this time, the control model calculated by the control model calculating unit 220 is accepted by the control model updating unit 230, and overwritten into the control model storing unit 240.

This causes the control model that is used in optimal control to be updated (ST250).

The optimal control of the thermal source system 110 by the optimal control unit 120 is performed based on the control model that is updated in this way (ST300).

The operation when incorrect data is included in the analysis data will be explained next. A variety of factors may cause an incorrect data set wherein the analysis data is incorrect or contains incorrect values. Here it will be assumed, for example, that a data set comprising the following eight points has been obtained as analytic data (X, Z) expressing the relationship between the chilled water outlet temperature X and the operating cost Z of the thermal source system 110.

Of these, C' and D' are data that deviate from the correct data that actually should have been received.

Figure 9:
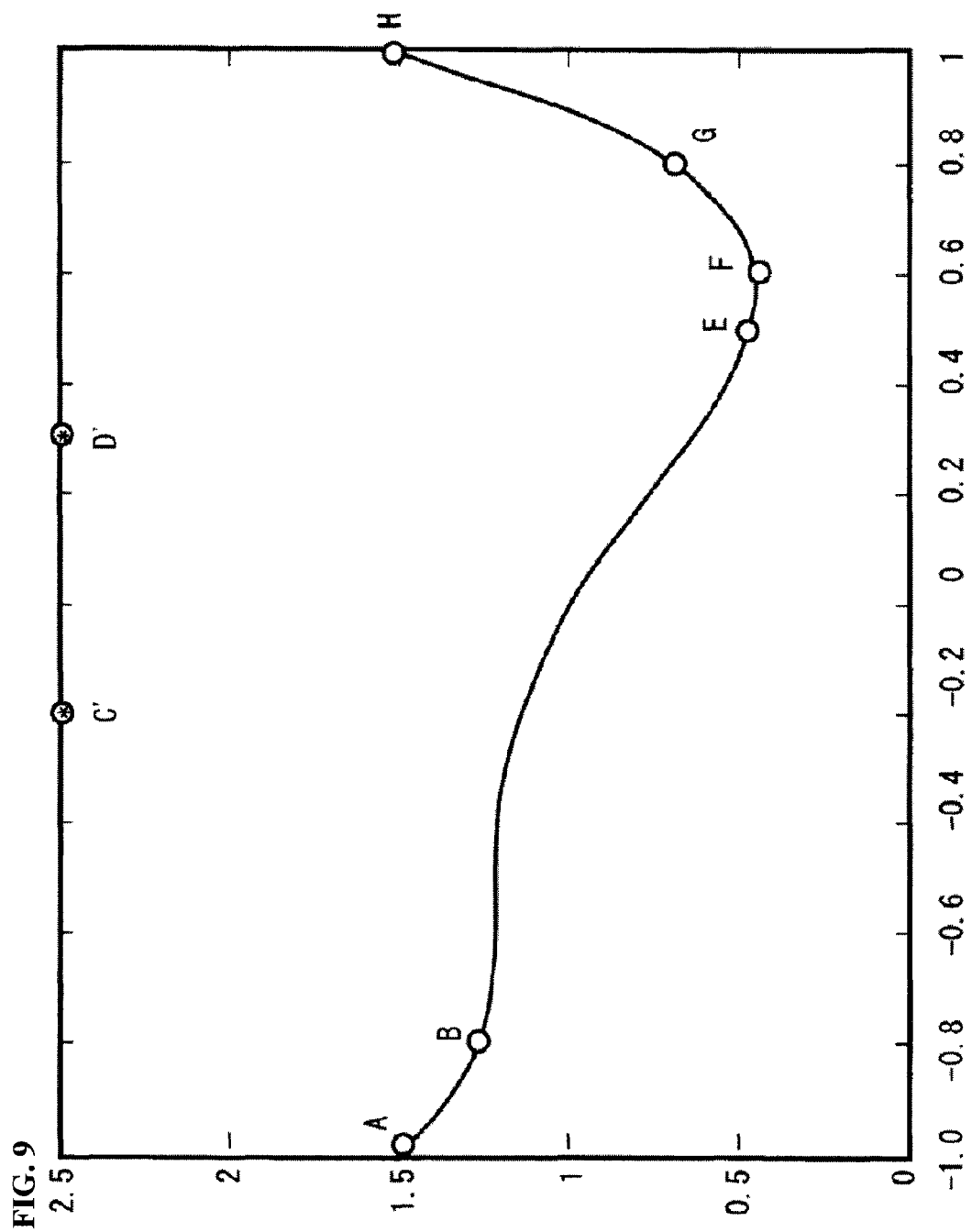
FIG. 9 is a diagram illustrating data from A through H, including C' D', in a graph.

That is, as illustrated in FIG. 9, although A, B, E, F, G, and H are points on the Equation 1, which is an appropriate control model for the thermal source system 110, C' and D' are points that deviate from Equation 1.

A (−1.0, 1.5),
B (−0.8, 1.2624),
C' (−0.2, 2.5),
D' (0.3, 2.5),
E (0.5, 0.4688),
F (0.6, 0.4504),
G (0.8, 0.6864),
H (1.0, 1.5)

In this type of case, when the aforementioned data set of A, B, C', D', E, F, G, and H is inputted into the analysis data storing unit 210 (ST200), a control model is calculated in the control model calculating unit 220 (ST210), and a quadratic polynomial for approximating the aforementioned 8 points is calculated in the quadratic polynomial calculating unit 252 (ST220).

Figure 10:
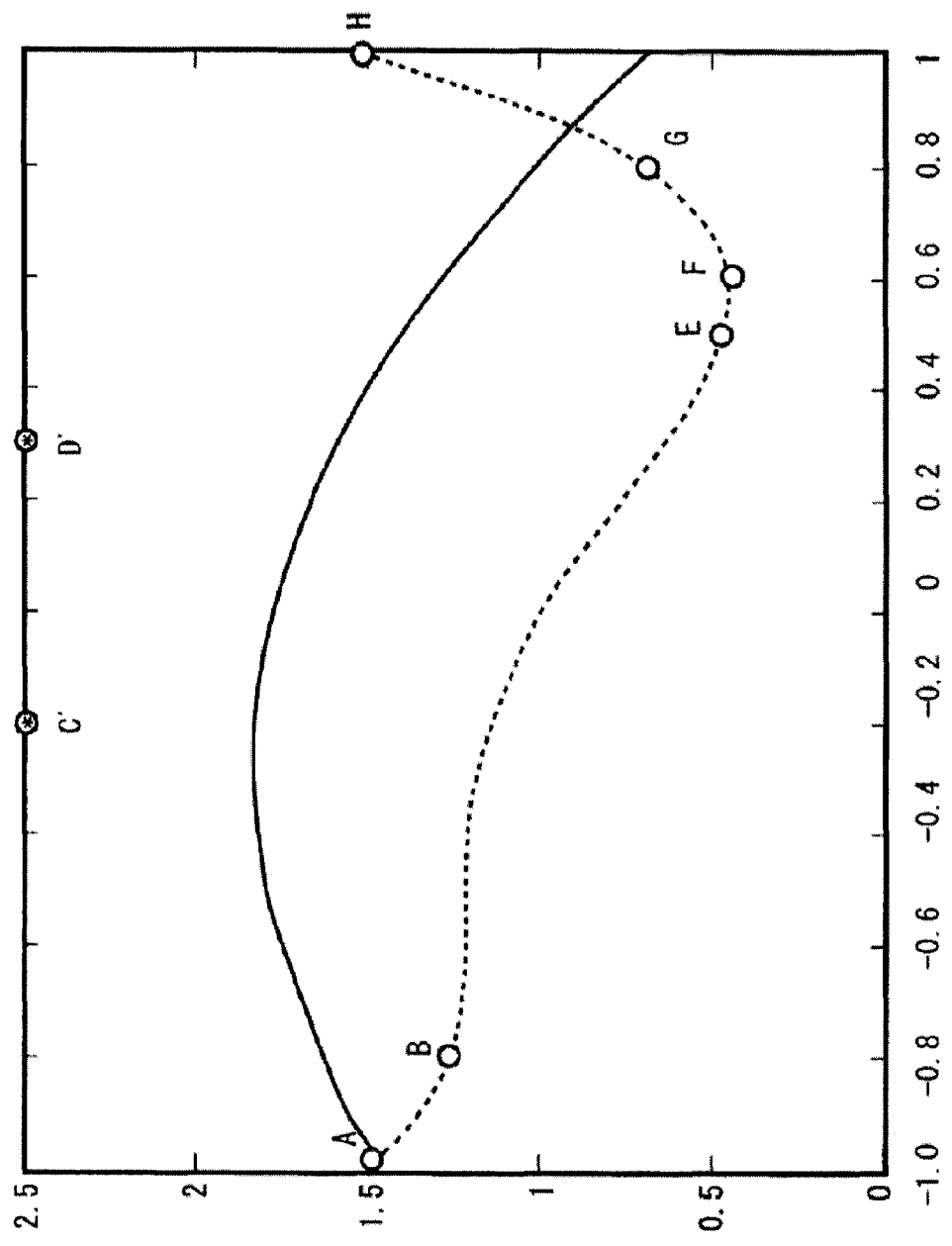
FIG. 10 is a diagram illustrating the quadratic polynomial of Equation 3 in a graph.

At this time, the quadratic polynomial, due to the influence of the aberrant points C' and D', will be in a upwardly convex form, as in FIG. 10.

When represented in an equation, the result is as follows:

$$Z = -0.7043X^2 - 0.3926X + 1.7713 \quad \text{(Equation 3)}$$

In the characteristic evaluating unit 253, an evaluation is made as to whether or not the quadratic polynomial (Equation 3) matches the prior knowledge obtained in advance (ST230).

In this quadratic polynomial (Equation 3), the sign of the coefficient of the highest order term $X^2$ is negative. Consequently, the quadratic polynomial (Equation 3) can be seen to be upwardly convex. At this point, the prior knowledge of "Downwardly convex" is set in the function characteristic prior knowledge storing unit 251, and thus the form (characteristic) of the quadratic polynomial (Equation 3) does not match the prior knowledge (ST240: NO).

When the form (characteristic) of the quadratic polynomial (Equation 3) does not match the prior knowledge (ST240: NO), then the characteristic evaluating unit 253 does not direct the control model updating unit 230 to update the control model (ST270).

The data in the analysis data storing unit 210 and the control model calculated by the control model calculating unit 220 may be deleted at this time, or may be overwritten the next time analysis data is written.

Even when the control model is not updated, still the control model that is calculated next, and each time thereafter, is stored in the control model storing unit 240, and the control of the thermal source system 110 by the optimal control unit 120 may be performed using that that control model.

Moreover, even when the control model could not be updated, still this is substantially better than if there had been updating and storage of an incorrect model based on incorrect analysis data.

This example produces the following results:

(1) As described above, the form of the function when the apparatus to be controlled (the thermal source system 110) is expressed in a quadratic polynomial is stored as function characteristic prior knowledge in the function characteristic prior knowledge storing unit 251. Moreover, a quadratic polynomial that approximates the analysis data using a quadratic function is calculated in the quadratic polynomial calculating unit 252.

If the analysis data are correct, then the quadratic polynomial should match the characteristic prior knowledge of the thermal source system 110 obtained in advance. In this case, the analysis data upon which the quadratic polynomial was calculated can be considered to be suitable, and the data set can be considered to reflect the characteristics of the thermal source system 110. Furthermore, the control model calculated from these suitable analysis data can also be considered to be suitable. Given this, when the characteristic (form) of the quadratic polynomial matches the characteristic prior knowledge obtained in advance, the characteristic evaluating unit 253 instructs the control model updating unit 230 to update the control model, which is updated with the control model calculated by the control model updating unit 220.

This makes it possible to execute optimal control using an appropriate control model based on the suitable analysis data.

(2) On the other hand, when the quadratic polynomial does not match the characteristic prior knowledge of the thermal source system 110 obtained in advance, then it can be assumed that the analysis data is incorrect due to the effects of noise, or the like. For example, when the quadratic polynomial is calculated as being upwardly convex, then clearly the quadratic polynomial is incorrect, in light of the inherent characteristics of the thermal source system 110.

In this case, the analysis data based on which the quadratic polynomial was calculated can also be assumed to be incorrect, and the data set can be considered to not reflect the characteristics of the thermal source system 110 accurately.

Furthermore, the control model calculated from the incorrect analysis data can also be considered to be incorrect. Given this, when the quadratic polynomial does not match the characteristic prior knowledge that was obtained in advance, the characteristic evaluating unit 253 does not instruct the control model updating unit 230 to update the control model.

This makes it possible to avoid performing incorrect control based on an incorrect control model.

(3) When evaluating whether or not analysis data is correct, a quadratic polynomial is calculated, and an evaluation of the suitability of the analysis data is performed from the characteristic (form) of the quadratic polynomial. The calculation of the quadratic function approximation curve, and the calculation of the form (characteristic) of the quadratic polynomial are both simple, and thus the data suitability evaluation in the present form of embodiment is easy and simple.

For example, the control model itself, calculated by the control model calculating unit, may be a high-order equation in order to perform high-accuracy optimal control, or may include a specialty function. This would result in difficulty in determining automatically whether or not this type of complex equation matches the prior knowledge.

In this point, the suitability is evaluated at the level of a quadratic polynomial, and thus the structure and processing operation in the present form of embodiment are simple.

Furthermore, because, in this way, the suitability is evaluated at the level of a quadratic polynomial, prior knowledge possessed by an operator, or the like, can be employed to perform the evaluation of whether or not the analysis data is suitable.

While the fundamental structure in this example is identical to that in the previous example, this example has a distinctive feature in the point that an evaluation is made as to whether or not the characteristics of the quadratic polynomial match the prior knowledge within a range of upper and lower limit values for a variable.

Figure 11:
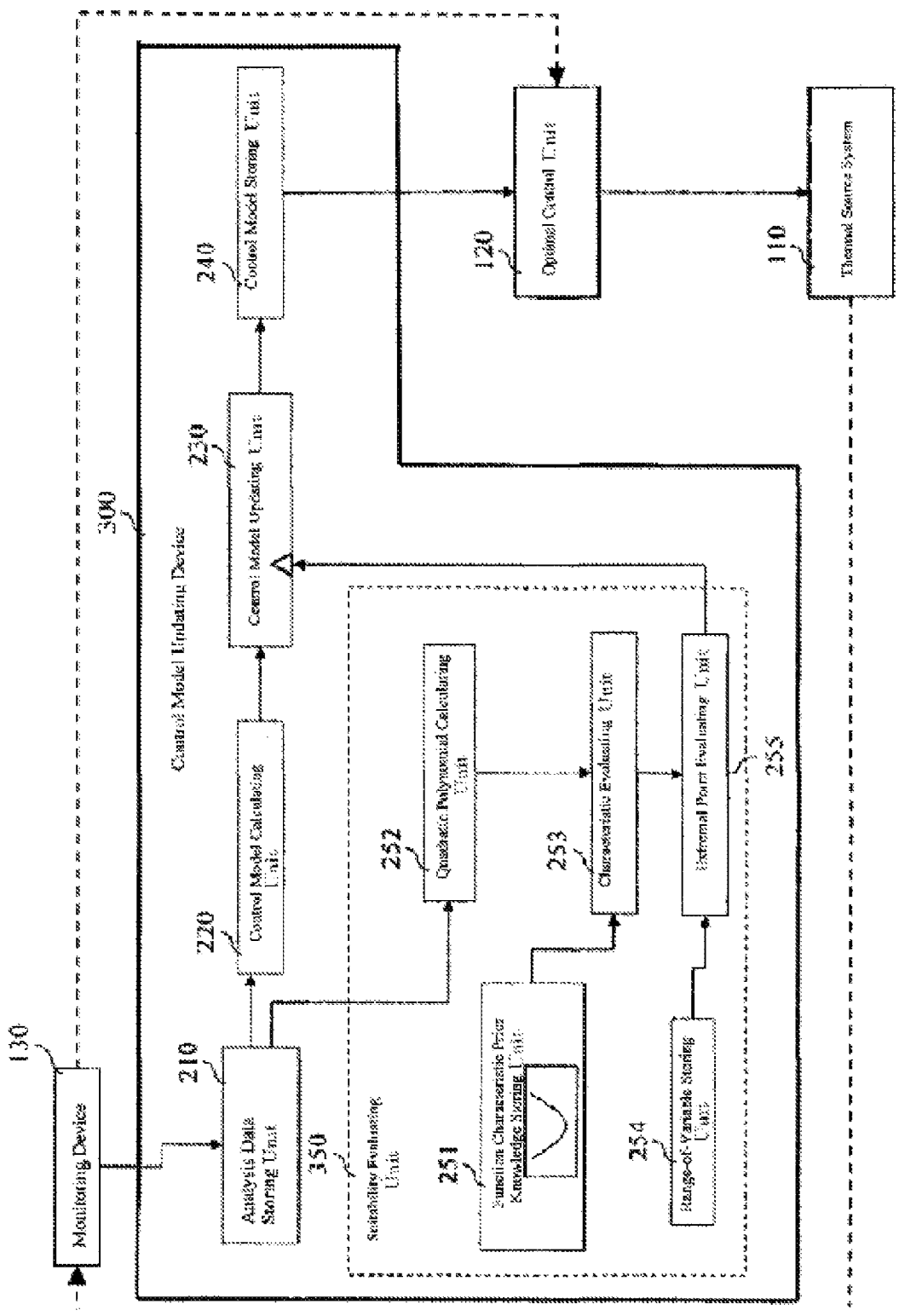
FIG. 11 is a functional block diagram of a control model updating device according an example.

FIG. 11 is a functional block diagram of a control model updating device 300 according to this example.

In FIG. 11, a suitability evaluating unit 350 includes a range-of-variable storing unit 254 and an extremal point evaluating unit 255.

Upper and lower limit values for the variable are set and stored as constraint conditions on the variable in the rangeof-variable storing unit 254. For example, a range of 6° C. to 12° C. may be set as the range for the chilled water outlet temperature. Note that for the explanation it will be assumed that normalized quantities are used, with −1.0 and 1.0 set as the upper and lower limit values.

The extremal point evaluating unit 255 calculates the extremal point of the quadratic polynomial calculated by the quadratic polynomial calculating unit 252, and then evaluates whether or not the extremal point is within the range of the upper and lower limit values. If the extremal point is within the range of the upper and limit lower values, then the extremal point evaluating unit 255 directs the control model updating unit 230 to update the control model.

Conversely, if the extremal point is outside of the upper and lower limit values, then the extremal point evaluating unit 255 does not direct the control model updating unit 230 to update the control model.

Note that an extremal point is the value of the variable that produces an extremum. That is, when X is an extremal point, then Z assumes an extremum (a maximum or a minimum).

Figure 12:
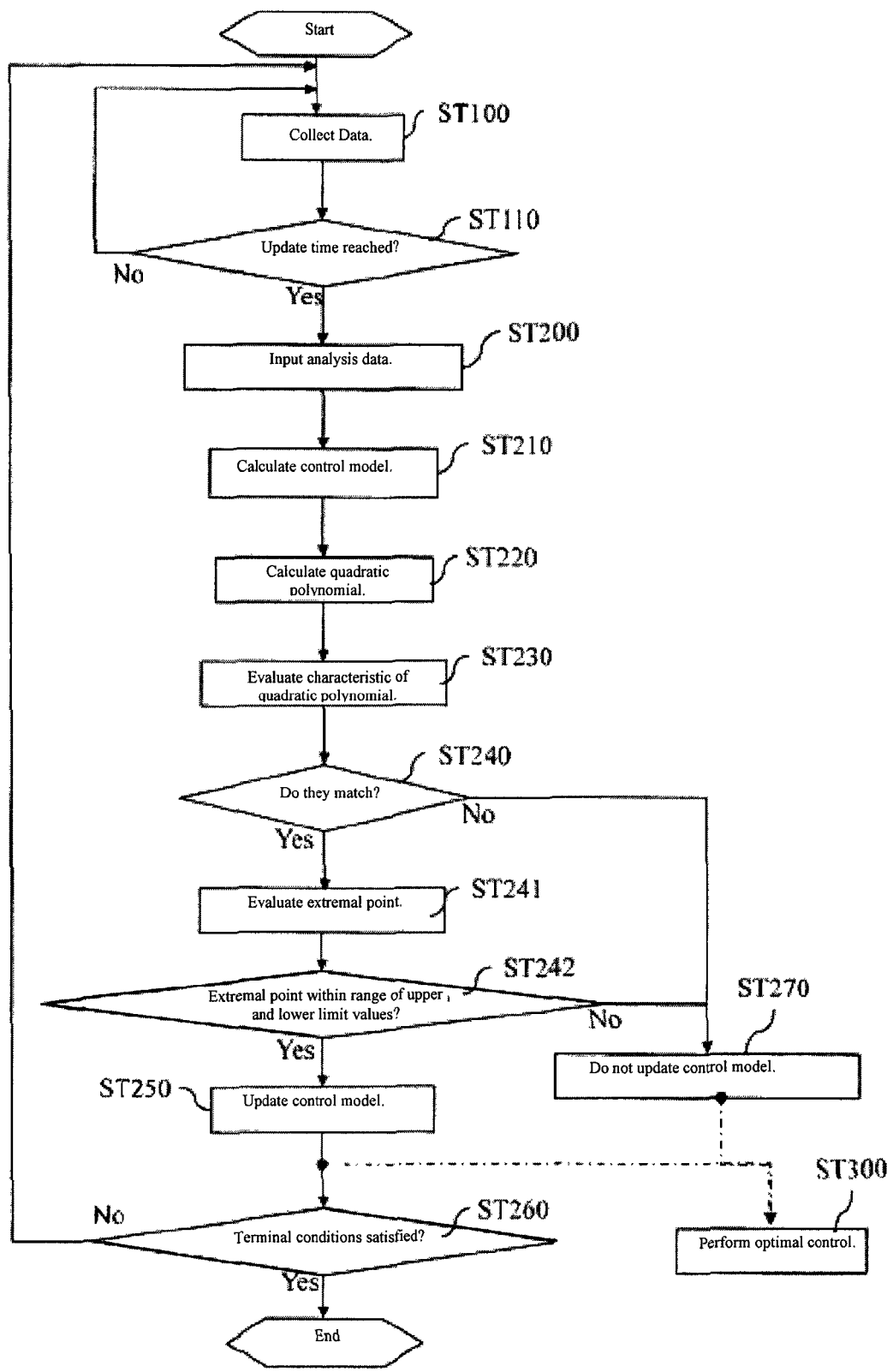
FIG. 12 is a flowchart for explaining the sequence of operations in the control model updating device.

FIG. 12 is a flowchart for explaining the sequence of operations in the control model updating device 300.

Here it will be assumed, for the analysis data, that a data set comprising the following eight points (A through H) has been obtained as analytic data (X, Z) expressing the relationship between the chilled water outlet temperature X and the operating cost Z of the thermal source system 110.

Figure 13:
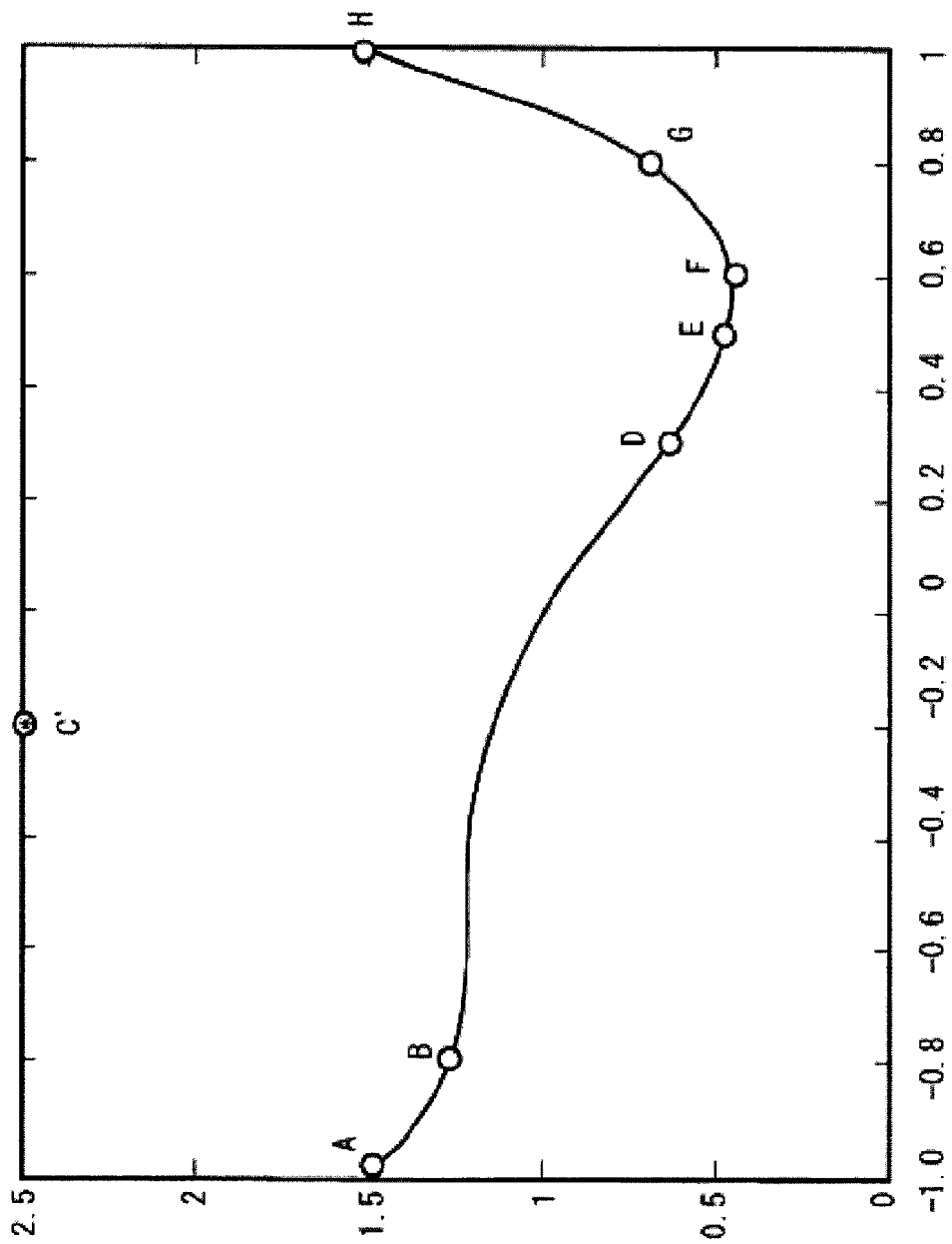
FIG. 13 is a diagram illustrating data from C' and A through H in a graph.

Of these, C' is data that deviates from the correct data that actually should have been received. That is, as illustrated in FIG. 13, although A, B, D, E, F, G, and H are points on the Equation 1, which is an appropriate control model for the thermal source system 110, C' is a point that deviates from Equation 1.

A (−1.0, 1.5),
B (−0.8, 1.2624),
C' (−0.2, 2.5),
D (0.3, 0.6492),
E (0.5, 0.4688),
F (0.6, 0.4504),
G (0.8, 0.6864),
H (1.0, 1.5).

In this type of case, when the aforementioned data set of A, B, C', D', E, F, G, and H is inputted into the analysis data storing unit 210 (ST200), a control model is calculated in the control model calculating unit 220 (ST210), and a quadratic polynomial for approximating the aforementioned 8 points is calculated in the quadratic polynomial calculating unit 252 (ST220).

Figure 14:
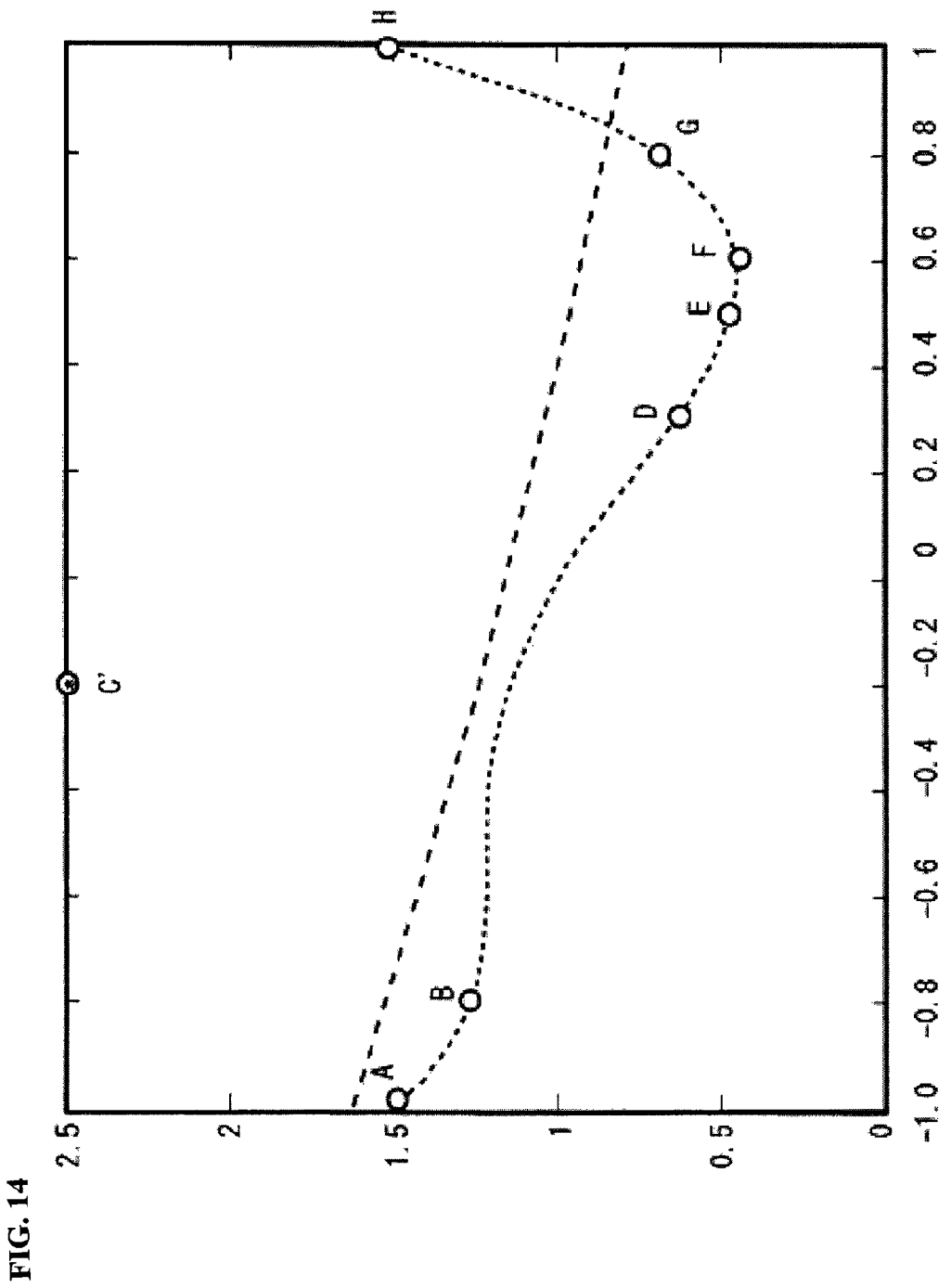
FIG. 14 is a diagram illustrating the quadratic polynomial of Equation 4.

At this time, the quadratic polynomial, due to the influence of the aberrant point C', will be as in FIG. 14. That is, when X is in the range of −1.0 through 1.0, the quadratic polynomial will be monotonically decreasing. When represented in an equation, the result is as follows:

$$Z=0.0525X^2-0.4170X+1.1633 \quad \text{(Equation 4)}$$

In the characteristic evaluating unit 253, an evaluation is made as to whether or not the quadratic polynomial (Equation 4) matches the prior knowledge obtained in advance (ST230). In this quadratic polynomial (Equation 4), the sign of the coefficient of the highest order term $X^2$ is positive. Consequently, the quadratic polynomial (Equation 4) can be seen to be downwardly convex.

At this point, the prior knowledge of "Downwardly convex" is set in the function characteristic prior knowledge storing unit 251, and thus the form (characteristic) of the quadratic polynomial (Equation 4) matches the prior knowledge (ST240: YES).

Here, in this example, even when an evaluation is made by the characteristic evaluating unit 253 that there is a match to the prior knowledge, still the control model is not updated immediately, but rather an extremal point evaluation is performed (ST241).

In the extremal point evaluation, first the extremal point of the quadratic polynomial (Equation 4) is calculated by the extremal point calculating unit 255.

The extremal point can be calculated as shown below from the condition that the first derivative will be zero.

$$dZ/dX=0.15X-0.4170=0$$

$$X=3.9714$$

That is, it can be seen that when X=3.9714 it is an extremal point.

The upper and lower limit values set in the range-of-variable storing unit 254 are read in next.

Here the upper and lower limit values are −1.0 and 1.0.

An evaluation is performed next as to whether or not the extremal point (X=3.9714) falls within the upper and lower limit values (ST240).

In this case, the extremal point (X=3.9714) is outside of the aforementioned range of the upper and lower limit values (−1.0 through 1.0) (ST242: NO).

In this case, the extremal point evaluating unit 255 does not direct the control model updating unit 230 to update the control model.

Consequently, the control model updating unit 230 does not update the control model (ST270).

Additionally, if the extremal point falls into the range that has been set for the upper and lower limit values, then the control model updating unit 230 is directed by the extremal point evaluating unit 255 to update the model.

In this event, the control model calculated by the control model calculating unit 220 is accepted by the control model updating unit 230, and is overwritten into the control model spring unit 240.

The control model used in the optimal control is updated thereby (ST250).

The example, in this way, provides the following effects, in addition to those set forth above:

(4) Actual equipment cannot, of course, produce unbounded parameter values.

For example, in the actual thermal source system 110, upper and lower limit values are set on the outlet temperature (X) of the chilled water from the chiller 111 for the purposes of preventing freezing of the chiller 111, dehumidifying the air supply into the room, and the like, and thus the chilled water outlet temperature is constrained to be between 6° C. and 12° C., for example. Furthermore, the optimal control point should exist within the range of the upper and lower limit values, given the characteristics of the thermal source system.

However, there may be cases wherein the calculated control model does not have an extremum within the range of the upper and lower limit values, and in the range of variables that can actually be used, is monotonically increasing or monotonically decreasing. In such a case, while there is a high probability that the analysis data is not suitable, there is the danger that a suitability evaluation of the analysis data using the characteristic evaluation (upwardly convex or downwardly convex) in the characteristic evaluating unit 253 would be inadequate.

In this regard, an extremal point evaluation is performed in the second form of embodiment in addition to the characteristic evaluation (upwardly convex versus downwardly convex) in the characteristic evaluating unit 253, to evaluate whether or not the optimal control point is within the actual usable range of the variable.

Doing so makes it possible to avoid the use of inappropriate control based on an incorrect control model.

(5) In addition, the extremal point of the quadratic polynomial is used in the evaluation as to whether or not the optimal control point is within the range of the variable.

Because the extremal point of a quadratic polynomial is determined uniquely, the structure and sequence of operations of the present form of embodiment can be simple.

Here, in the example, if the extremal point is within the range of the variable, then it is concluded that the analysis data is suitable.

In contrast, depending on the characteristic to be controlled, there may be monotonic increase or monotonic decrease over the range of the variable.

In such a case, in the evaluation in the extremal point evaluating unit 255, the determination may be that a case wherein the extremal point is greater than the upper limit value or the extremal point is less then the lower limit value is appropriate.

That is, it can be determined in the evaluation in the characteristic evaluating unit 253 that the quadratic polynomial is downwardly convex, and, in the evaluation by the extremal point evaluating unit 255, it can be concluded that there is monotonic decrease if the extremal point is greater than the upper limit value. Moreover, it can be determined in the evaluation in the characteristic evaluating unit 253 that the quadratic polynomial is downwardly convex, and, in the evaluation by the extremal point evaluating unit 255, it can be concluded that there is monotonic increase if the extremal point is less than the lower limit value.

This structure makes it possible to evaluate the suitability of the analysis data in accordance with the characteristic to be controlled.

Modified Example 1

While, for ease in the explanation, a case was used as an example in the examples of embodiment set forth above wherein there was only a single variable (the chilled water outlet temperature X), the present invention can be applied, of course, to second-order equations with multiple variables.

For example, the operating cost Z may be expressed as a function of a plurality of variables X, Y, . . . .

Note that the maximum order for each variable is no more than second order.

$$Z = f(X, Y, \ldots)$$

At this time, if the Hessian matrix of the second-order partial differentials of the function f for each of the input parameters is positive definite (that is, all of the eigenvalues are positive), then the function f is a downwardly convex function.

If negative definite (that is, if all eigenvalues are negative), then the function is an upwardly convex function.

Furthermore, for an extremum as well, the extremum and the extremal point can be calculated easily by setting up a system of first-order equations with the conditions that the partial differentials for each of the input parameters is 0, and then solving the system of equations.

Consequently, it is possible to evaluate whether or not the extremal point falls within the range of the upper and lower limit values for each individual parameter.

A specific example of this will be explained below.

For example, the relationship between inputs and outputs in the thermal source system 110 may be expressed by the equation below.

Figure 15:
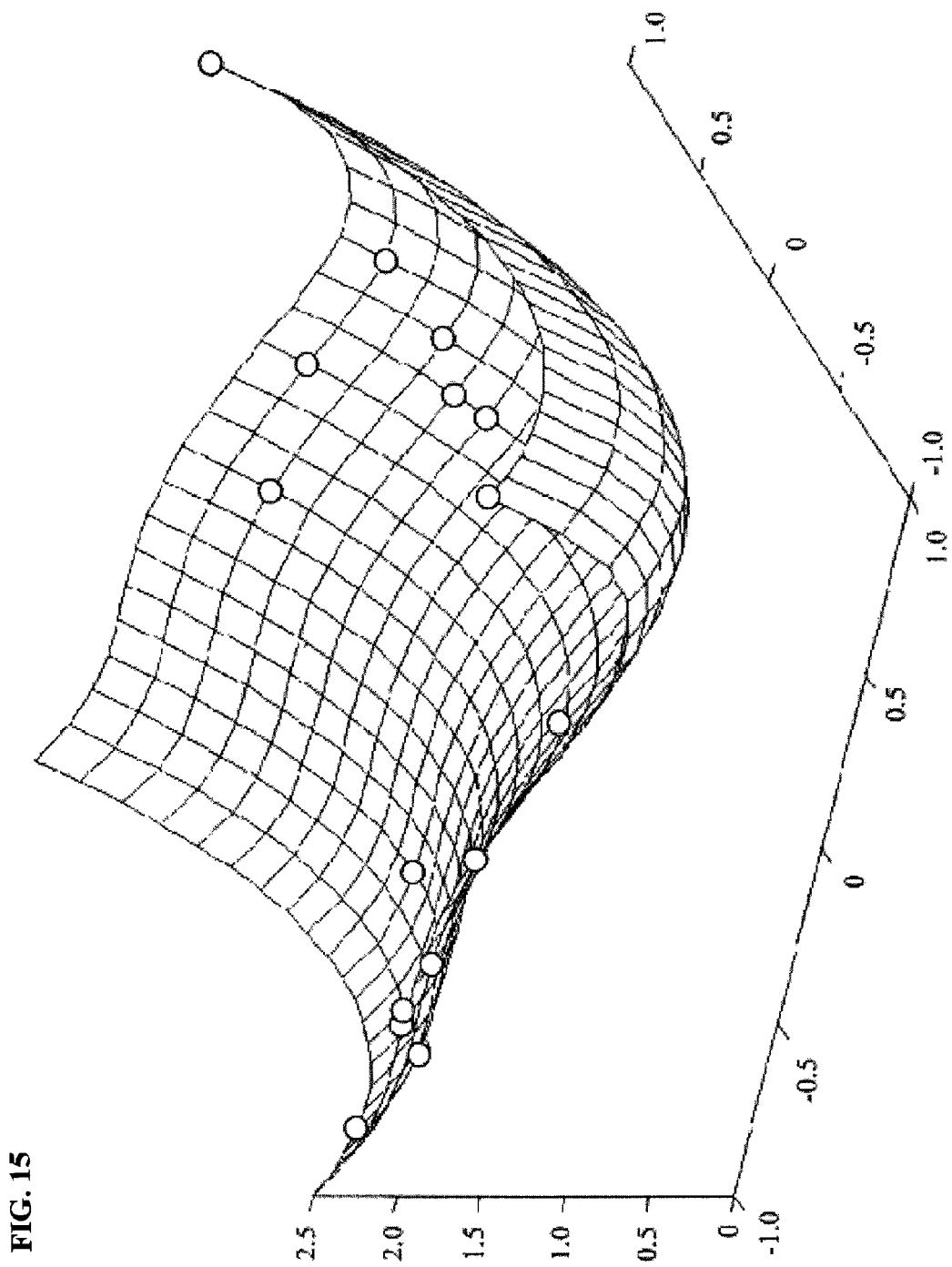
FIG. 15 is a diagram illustrating the thermal source system control model in Modified Example 1 as a two-variable function.

This equation, when shown as a graph, is as illustrated in FIG. 15.

$$Z = 1.5X^4 + X^3 - X^2 + Y^2 - X + 1 \qquad \text{(Equation 5)}$$

In Equation 5, the variable Y is an independent variable, and a minimum for Z exists relative to the variable X.

That is, Equation 5 is a downwardly convex function in respect to the variable X.

Additionally, independently of the variable X, there is a minimum for Z in respect to the variable Y.

That is, Equation 5 is a downwardly convex function in respect to the variable Y.

Here it is assumed that the data set below of the 18 points of A through R is obtained as the analysis data (X, Y, Z).

That is, it is assumed that a data set of the 18 points from A through R is applied by the monitoring devices to the analysis data storing unit 210.

The distribution of these points is illustrated in FIG. 15.

These points are all data on the curved surface given by the fourth order equation in equation 5, above.

A (0.1, −0.6, 1.25),
B (−0.1, 0.8, 1.73),
C (−1.0, −0.7, 1.99),
D (−0.4, 0.6, 1.57),
E (−0.7, 0.0, 1.23),
F (0.5, 0.9, 1.28),
G (−0.4, −0.9, 2.02),
H (0.0, −0.2, 1.04),
I (−0.7, −0.8, 1.87),
J (0.2, 0.9, 1.58),
K (−0.5, −1.0, 2.21),
L (0.3, 0.5, 0.99),
M (0.3, 0.6, 1.00),
N (0.4, 0.7, 1.03),
O (−0.1, −0.9, 1.90),
P (−0.9, −0.3, 1.44),
Q (1.0, −1.0, 2.50),
R (1.0, 1.0, 2.50).

In the quadratic polynomial calculating unit 252, a quadratic polynomial is calculated for the characteristic evaluation by the characteristic evaluating unit 253.

Equation 6 is obtained through calculating the quadratic polynomial through the application of multivariate analysis, in a broad sense (multiple regression analysis, vector regression, or the like) to the analysis data set forth above.

Figure 16:
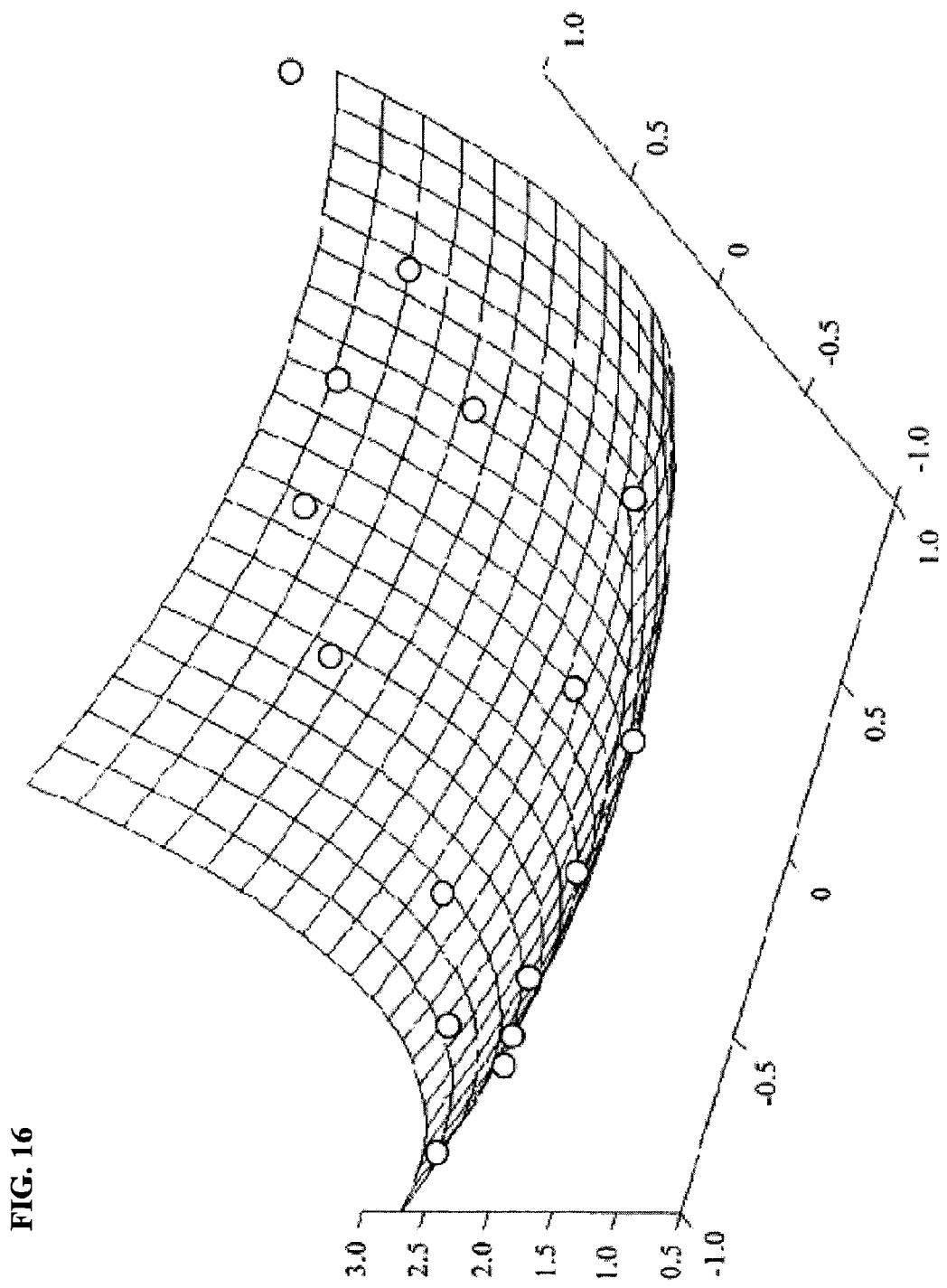
FIG. 16 is a diagram illustrating Equation 6 in a graph.

When this Equation 6 is shown is a graph, but the result is as illustrated in FIG. 16.

$$Z = 0.5877X^2 - 0.1585XY + 1.2296Y^2 - 0.2173X - 0.0648Y + 0.7532 \qquad \text{(Equation 6)}$$

Given this, in the characteristic evaluation in the characteristic evaluating unit 253, a calculation is made as to whether Equation 6 is downwardly convex or upwardly convex.

At this time, the Hessian matrix (the second-order differentials relative to the input parameters) is calculated first for Equation 6:

[Formula 1]

$$H = \begin{bmatrix} \frac{\partial^2 Z}{\partial X^2} & \frac{\partial^2 Z}{\partial X \partial Y} \\ \frac{\partial^2 Z}{\partial Y \partial X} & \frac{\partial^2 Z}{\partial Y^2} \end{bmatrix} = \begin{bmatrix} 1.1754 & -0.1585 \\ -0.1585 & 2.4593 \end{bmatrix} \quad \text{(Equation 7)}$$

Defining the eigenvalues as $\lambda$ and the identity matrix as I, the eigenvalue equation for the Hessian matrix H will be as given in Equation 8.

[Formula 2]

$$|H - \lambda I| = \begin{vmatrix} 1.1754 - \lambda & -0.1585 \\ -0.1585 & 2.4593 - \lambda \end{vmatrix} = 0 \quad \text{(Equation 8)}$$

Solving the eigenvalue equation (Equation 8), the eigenvalues $\lambda$ are 1.1561 and 2.4786.

Because the eigenvalues $\lambda$ are positive values, it is known that the Hessian matrix of Equation 7 is positive definite.

By this it is known that the quadratic polynomial of Equation 6, calculated based on the analysis data, is downwardly convex.

Additionally, if "downwardly convex" was set and stored as the prior knowledge in the function characteristic prior knowledge storing unit 251, then the characteristic of the quadratic polynomial of Equation 6 is evaluated as matching the prior knowledge that was stored in advance.

Additionally, the following can be performed for the extremal point evaluation.

A system of first-order equations can be solved with the condition that the first-order partial differentials for the variable X and the variable Y are equal to 0.

[Formula 3]

$$\frac{\partial Z}{\partial X} = 1.1754X - 0.1585Y - 0.2173 = 0 \quad \text{(Equation 9)}$$

$$\frac{\partial Z}{\partial Y} = -0.1585X + 2.4592Y - 0.0648 = 0 \quad \text{(Equation 10)}$$

When this is done, X is 0.1901 when the function is at an extremum.

Moreover, Y is 0.0386 when the function is at an extremum.

In this way, the extremal point can be calculated for X and Y, respectively. Moreover, if the ranges of the variables set in the range-of-variable storing unit 254 are from −1.0 to 1.0 for both the X and Y, then the extremal points are within the range of the upper and lower limit values for both the X and Y.

Consequently, it can be seen that Equation 6 is a downwardly convex function even within the range of the upper and lower limit values (by the extremal point evaluating unit 255).

Modified Example 2

While in the examples set forth above the evaluations by the characteristic evaluation and the extremal point evaluation were evaluations of only whether or not the control model should be updated, the evaluation results may be stored in a data table.

For example, the control models, quadratic polynomials, characteristic evaluations, extremal points, whether or not to perform the updating, and the times thereof may be stored in a table.

An example of such a table is illustrated in Table 1.

TABLE 1

| Control Model | Quadratic Polynomial | Characteristic Evaluation | Extremal Point | Update | Time |
|---|---|---|---|---|---|
| Z = F (X, ... ) | Z = aX² + ... | Downwardly Convex | X = ... | Okay | ..., ..., ... |
| Z = F (X, ... ) | Z = aX² + ... | ... | ... | Okay | ..., ..., ... |
| Z = F (X, ... ) | Z = aX² + ... | ... | ... | Okay | ..., ..., ... |
| Z = F (X, ... ) | Z = −kX² + ... | Upwardly Convex | ... | No | ..., ..., ... |
| ... | ... | ... | ... | ... | ... |

This makes it possible for the operator to evaluate whether or not the updating went well.

Furthermore, if the updating is continuously unsuccessful, then the results of the characteristic evaluations and the values of the extremal points can be examined to perform a cause analysis such as whether or not a failure has occurred.

Note that the present invention is not limited to the forms forth above, but rather may be modified as appropriate in a range that does not deviate from the spirit or intent thereof.

In the other example, the upper and lower limit values set in the range-of-variable storing unit may be updated continuously through provision from the monitoring devices.

While in the forms of embodiment set forth above a structure provided with a characteristic evaluating unit for evaluating whether a quadratic polynomial is downwardly convex or upwardly convex was presented as an example, this characteristic evaluating unit may be eliminated, and the suitability evaluating unit may be structured from a quadratic polynomial calculating unit, a range-of-variable storing unit, and an extremal point evaluating unit.

For example, if it is believed that there will be essentially no errors in the general trend of the analysis data (that is, whether it is upwardly convex or downwardly convex), then only the extremal point evaluation need be performed.

While in the forms of embodiment set forth above the characteristic subject to control (the thermal source system) was downwardly convex because an example was used wherein the operating cost Z was the vertical axis, of course, if the indicator is converted correctly, for example, if the operating efficiency or energy conservation, or the like, is used as the vertical axis, then the characteristic to be controlled (the thermal source system) may be upwardly convex instead.

Of course, the present invention can be applied even when the characteristic to be controlled manifests as upwardly convex.

While, in the example set forth above, a thermal source system for cooling the temperature of a room was given as an example as the subject of control, the thermal source system may instead, of course, be one for heating a room.

Furthermore, the present invention is effective for controlling a variety of devices having optimal control points, not limited to air conditioners.

The invention claimed is:

1. A control model updating device for calculating and updating a control model to control an apparatus, the control model being an approximate function, and the control model being calculated using analysis data that is provided in order to update the control model, the control model updating device comprising:
    a control model calculating unit calculating the control model using the analysis data;
    a control model updating unit updating through accepting a control model calculated by the control model calculating unit; and
    a data suitability evaluating unit evaluating the suitability of the analysis data,
    wherein the data suitability evaluating unit comprises:
        a characteristic prior knowledge storing unit storing prior knowledge regarding characteristics obtained in advance regarding the apparatus to be controlled;
        a quadratic polynomial calculating unit calculating a quadratic polynomial that approximates the analysis data using a quadratic function; and
        a characteristic evaluating unit comparing the characteristics of the quadratic polynomial, calculated by the quadratic polynomial calculating unit, to the prior knowledge stored in the characteristic prior knowledge storing unit, and
    wherein the control model updating unit updates the control model when there is a match between the two in the comparison in the characteristic evaluating unit.

2. The control model updating device as set forth in claim 1, wherein,
    as to the prior knowledge that is set and stored in the characteristic prior knowledge storing unit, the characteristics are expressed by a quadratic polynomial that is either upwardly convex or downwardly convex.

3. The control model updating device as set forth in claim 1, wherein: the data suitability evaluating unit further comprises:
    a range-of-variable storing unit storing a range of variability of a variable as a constraint condition; and
    an extremal point evaluating unit comparing an extremal point of a quadratic polynomial calculated by the quadratic polynomial calculating unit to the range of variability of the variable, stored in the range-of-variability storing unit;
    wherein the control model updating unit performs the update of the control model when, in the evaluation by the extremal point evaluating unit, the relationship between the extremal point of the quadratic polynomial and the range of variability of the variable is appropriate.

4. The control model updating device as set forth in claim 3, wherein:
    the relationship between the extremal point of the quadratic polynomial and the scope of variability of the variable is any of the three patterns: the extremal point is within the range of variability of the variable, the extremal point is greater than an upper limit value, or the extremal point is less than an upper limit value; and
    the extremal point evaluating unit evaluates one of the three patterns as suitable using an evaluation standard that is set in accordance with characteristics obtained in advance for that which is to be controlled.

5. A control model updating method for calculating and updating a control model to control an apparatus, the control model being an approximate function, and the control model being calculated using analysis data that is provided in order to update a control model, the control model updating method comprising:
    a control model calculating step calculating the control model using the analysis data;
    a quadratic polynomial calculating step calculating a quadratic polynomial that approximates the analysis data using a quadratic function;
    a characteristic evaluating step comparing a characteristic of the calculated quadratic polynomial to prior knowledge regarding a characteristic obtained in advance regarding the apparatus to be controlled; and
    a control model updating step updating the control model when there is a match between the two in the comparison in the characteristic evaluating step.

6. An air-conditioning control system, comprising:
    a control model updating device for calculating and updating a control model to control an apparatus, the control model being an approximate function, and the control model being calculated using analysis data that is provided in order to update the control model, the control model updating device having
        a control model calculating unit calculating the control model using the analysis data,
        a control model updating unit updating through accepting a control model calculated by the control model calculating unit, and
        a data suitability evaluating unit evaluating the suitability of the analysis data,
        wherein the data suitability evaluating unit has
            a characteristic prior knowledge storing unit storing prior knowledge regarding characteristics obtained in advance regarding the apparatus to be controlled,
            a quadratic polynomial calculating unit calculating a quadratic polynomial that approximates the analysis data using a quadratic function, and
            a characteristic evaluating unit comparing the characteristics of the quadratic polynomial, calculated by the quadratic polynomial calculating unit, to the prior knowledge stored in the characteristic prior knowledge storing unit, and
        wherein the control model updating unit updates the control model when there is a match between the two in the comparison in the characteristic evaluating unit;
    a thermal source system as the apparatus to be controlled; and
    a control unit controlling an operation of the thermal source system using a control model that is updated by the control model updating device.

7. A data suitability evaluating device for evaluating suitability of analysis data applied in order to calculate a control model for an apparatus to be controlled; comprising:
    a characteristic prior knowledge storing unit storing prior knowledge regarding characteristics obtained in advance regarding the apparatus to be controlled;
    a quadratic polynomial calculating unit calculating a quadratic polynomial that approximates the analysis data using a quadratic function; and
    a characteristic evaluating unit comparing the characteristics of the quadratic polynomial, calculated by the quadratic polynomial calculating unit, to the prior knowledge stored in the characteristic prior knowledge storing unit.

8. The data suitability evaluating device as set forth in claim 7, wherein,
as to the prior knowledge that is set and stored in the characteristic prior knowledge storing unit, the characteristics are expressed by a quadratic polynomial that is either upwardly convex or downwardly convex. A control model updating device includes a control model calculating unit that calculates a control model using analysis data, a control model updating unit that updates by accepting the control model, and a data suitability evaluating unit that evaluates the suitability of analysis data. The data suitability evaluating unit has a function characteristic prior knowledge storing unit that stores prior knowledge regarding a characteristic obtained in advance regarding the subject of control, a quadratic polynomial calculating unit that calculates a quadratic polynomial wherein the analysis data is approximated by a quadratic function, and a characteristic evaluating unit that compares a characteristic of the quadratic polynomial, calculated by the quadratic polynomial calculating unit, to prior knowledge stored in the function characteristic prior knowledge storing unit. The control model updating unit updates the control model if the two match in the comparison.

\* \* \* \* \*